United States Patent
Han et al.

(10) Patent No.: US 10,135,960 B2
(45) Date of Patent: Nov. 20, 2018

(54) MOBILE TERMINAL AND METHOD FOR CONTROLLING THE SAME

(71) Applicant: LG ELECTRONICS INC., Seoul (KR)

(72) Inventors: Dongsu Han, Seoul (KR); Hyunjin Kim, Seoul (KR); Jungwhan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/376,551

(22) Filed: Dec. 12, 2016

(65) Prior Publication Data

US 2017/0318135 A1    Nov. 2, 2017

Related U.S. Application Data

(60) Provisional application No. 62/328,625, filed on Apr. 28, 2016.

(30) Foreign Application Priority Data

Jul. 4, 2016 (KR) .................. 10-2016-0084283

(51) Int. Cl.
```
H04M 1/02      (2006.01)
G08B 21/14     (2006.01)
H04M 1/725     (2006.01)
```
(52) U.S. Cl.
CPC .......... *H04M 1/026* (2013.01); *G08B 21/14* (2013.01); *H04M 1/0202* (2013.01); *H04M 1/72522* (2013.01); *H04M 1/72569* (2013.01); *H04M 1/72572* (2013.01); *H04M 2250/10* (2013.01); *H04M 2250/12* (2013.01); *H04M 2250/22* (2013.01)

(58) Field of Classification Search
CPC ............... H04M 2250/12; G08B 21/14; G01N 33/497–2033/4975; B60K 28/00–28/165
See application file for complete search history.

(56) References Cited

U.S. PATENT DOCUMENTS

| | | | | |
|---|---|---|---|---|
| 5,220,919 | A * | 6/1993 | Phillips | G01N 33/4972 128/903 |
| 6,415,646 | B1 * | 7/2002 | Kessel | G01N 33/0075 340/632 |
| 6,858,182 | B1 * | 2/2005 | Ito | G01N 33/497 340/870.28 |
| 6,992,580 | B2 * | 1/2006 | Kotzin | G08B 21/0453 340/539.11 |
| 8,407,011 | B2 * | 3/2013 | Miller | G01N 1/26 702/19 |

(Continued)

OTHER PUBLICATIONS

European Patent Office Application Serial No. 16195960.6, Search Report dated Jul. 5, 2017, 7 pages.

*Primary Examiner* — Gennadiy Tsvey
(74) *Attorney, Agent, or Firm* — Lee, Hong, Degerman, Kang & Waimey

(57) ABSTRACT

A mobile terminal includes: a terminal body provided with a case having at least one hole; a gas sensor module disposed near the case, and configured to sense specific gas by air introduced through the hole; and a controller configured to set a type of gas to be sensed based on an activated specific function, and to control the gas sensor module to sense the gas.

20 Claims, 26 Drawing Sheets

(56) References Cited

U.S. PATENT DOCUMENTS

| | | | | |
|---|---|---|---|---|
| 8,442,801 B2* | 5/2013 | Gonla | | G08B 21/14 |
| | | | | 702/150 |
| 8,618,939 B2* | 12/2013 | Nabata | | A24F 47/00 |
| | | | | 340/384.3 |
| 8,686,864 B2* | 4/2014 | Hannon | | H04K 3/415 |
| | | | | 340/576 |
| 9,228,997 B2* | 1/2016 | Keays | | G01N 33/4972 |
| 9,299,238 B1* | 3/2016 | Ahmad | | A61B 5/4833 |
| 9,599,597 B1* | 3/2017 | Steele | | G01N 33/0004 |
| 2002/0084130 A1* | 7/2002 | Der Ghazarian | | B60K 28/063 |
| | | | | 180/272 |
| 2006/0058697 A1* | 3/2006 | Mochizuki | | A61B 5/0002 |
| | | | | 600/532 |
| 2007/0005267 A1 | 1/2007 | Li | | |
| 2008/0024323 A1* | 1/2008 | Kadaba | | G01N 33/0075 |
| | | | | 340/905 |
| 2008/0042859 A1* | 2/2008 | Dufour | | G08B 21/14 |
| | | | | 340/632 |
| 2009/0138560 A1* | 5/2009 | Stahl | | G06F 17/30943 |
| | | | | 709/206 |
| 2009/0325639 A1* | 12/2009 | Koehn | | B60K 28/063 |
| | | | | 455/556.1 |
| 2010/0234064 A1* | 9/2010 | Harris, Jr. | | B60K 28/066 |
| | | | | 455/556.1 |
| 2011/0032096 A1* | 2/2011 | Miller | | B60K 28/063 |
| | | | | 340/539.1 |
| 2011/0184539 A1* | 7/2011 | Agevik | | G11B 20/24 |
| | | | | 700/94 |
| 2011/0251800 A1* | 10/2011 | Wilkins | | G01J 3/02 |
| | | | | 702/24 |
| 2012/0314080 A1* | 12/2012 | Lee | | G08B 21/14 |
| | | | | 348/159 |
| 2013/0024106 A1* | 1/2013 | Kumar | | G01C 21/20 |
| | | | | 701/423 |
| 2013/0174646 A1* | 7/2013 | Martin | | G01N 33/00 |
| | | | | 73/31.02 |
| 2013/0192338 A1* | 8/2013 | Mayer | | G01N 33/4972 |
| | | | | 73/23.3 |
| 2014/0208829 A1* | 7/2014 | Lechner | | H04M 1/72525 |
| | | | | 73/31.01 |
| 2014/0223995 A1* | 8/2014 | Buhler | | G01N 33/0062 |
| | | | | 73/29.02 |
| 2014/0228698 A1* | 8/2014 | Roeck | | G01N 33/497 |
| | | | | 600/532 |
| 2014/0238100 A1 | 8/2014 | Londergan et al. | | |
| 2014/0342758 A1* | 11/2014 | Aleksy | | H04M 1/72569 |
| | | | | 455/456.3 |
| 2014/0377877 A1* | 12/2014 | Burgi | | G01N 33/4972 |
| | | | | 436/120 |
| 2015/0051502 A1* | 2/2015 | Ross | | H04M 5/772 |
| | | | | 600/532 |
| 2015/0141073 A1* | 5/2015 | Shen | | G01N 33/497 |
| | | | | 455/556.1 |
| 2015/0182146 A1 | 7/2015 | Hidaka | | |
| 2016/0005229 A1* | 1/2016 | Lee | | G06F 3/0488 |
| | | | | 345/419 |
| 2016/0050309 A1* | 2/2016 | Gooberman | | H04M 1/72577 |
| | | | | 455/418 |
| 2016/0081587 A1* | 3/2016 | Ghazarian | | A61B 5/082 |
| | | | | 600/301 |
| 2016/0171339 A1* | 6/2016 | Choi | | G06K 9/6293 |
| | | | | 382/103 |
| 2017/0078854 A1* | 3/2017 | Swaminathan | | H04W 4/043 |
| 2017/0099464 A1* | 4/2017 | Qu | | H04N 7/18 |

* cited by examiner

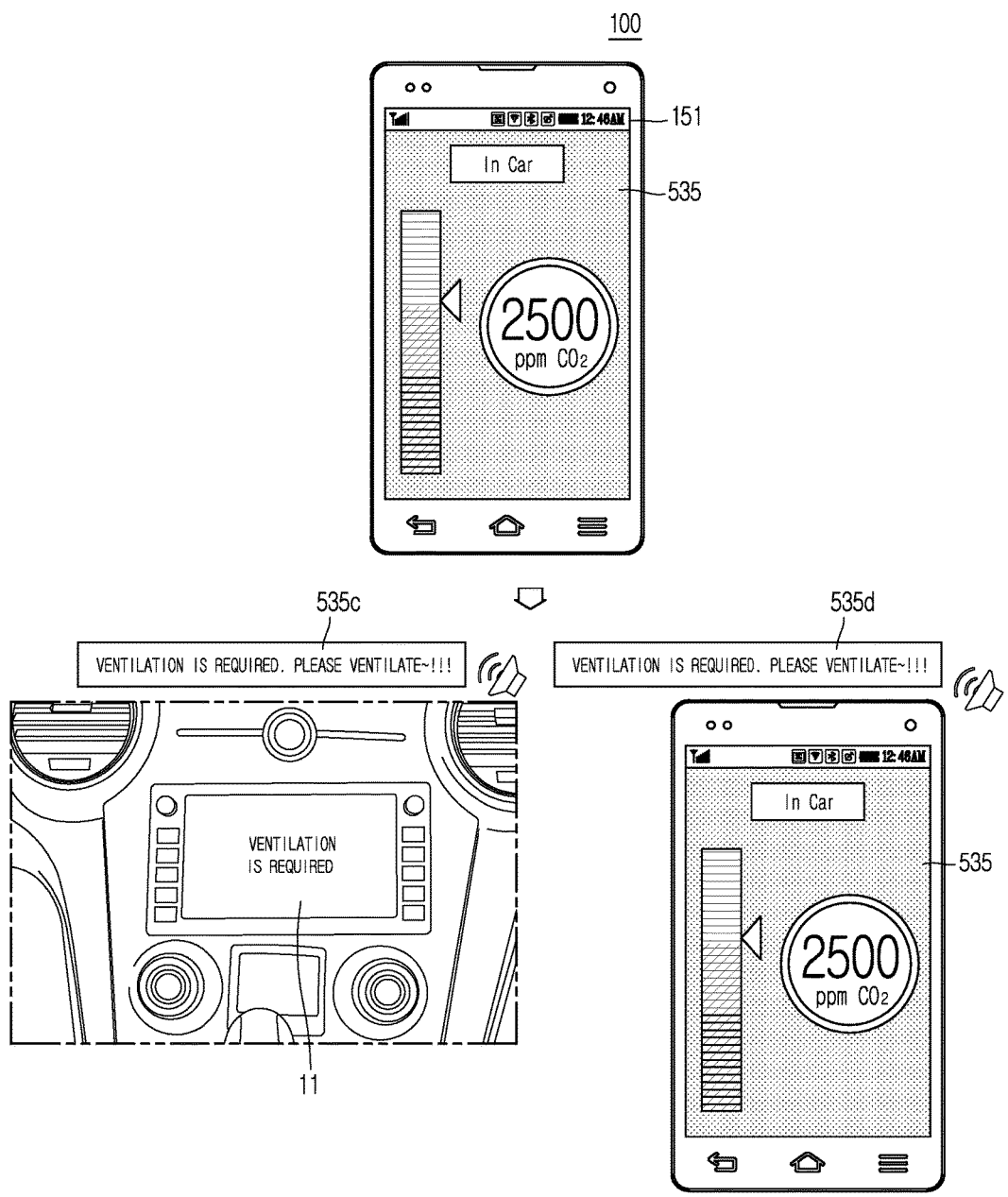

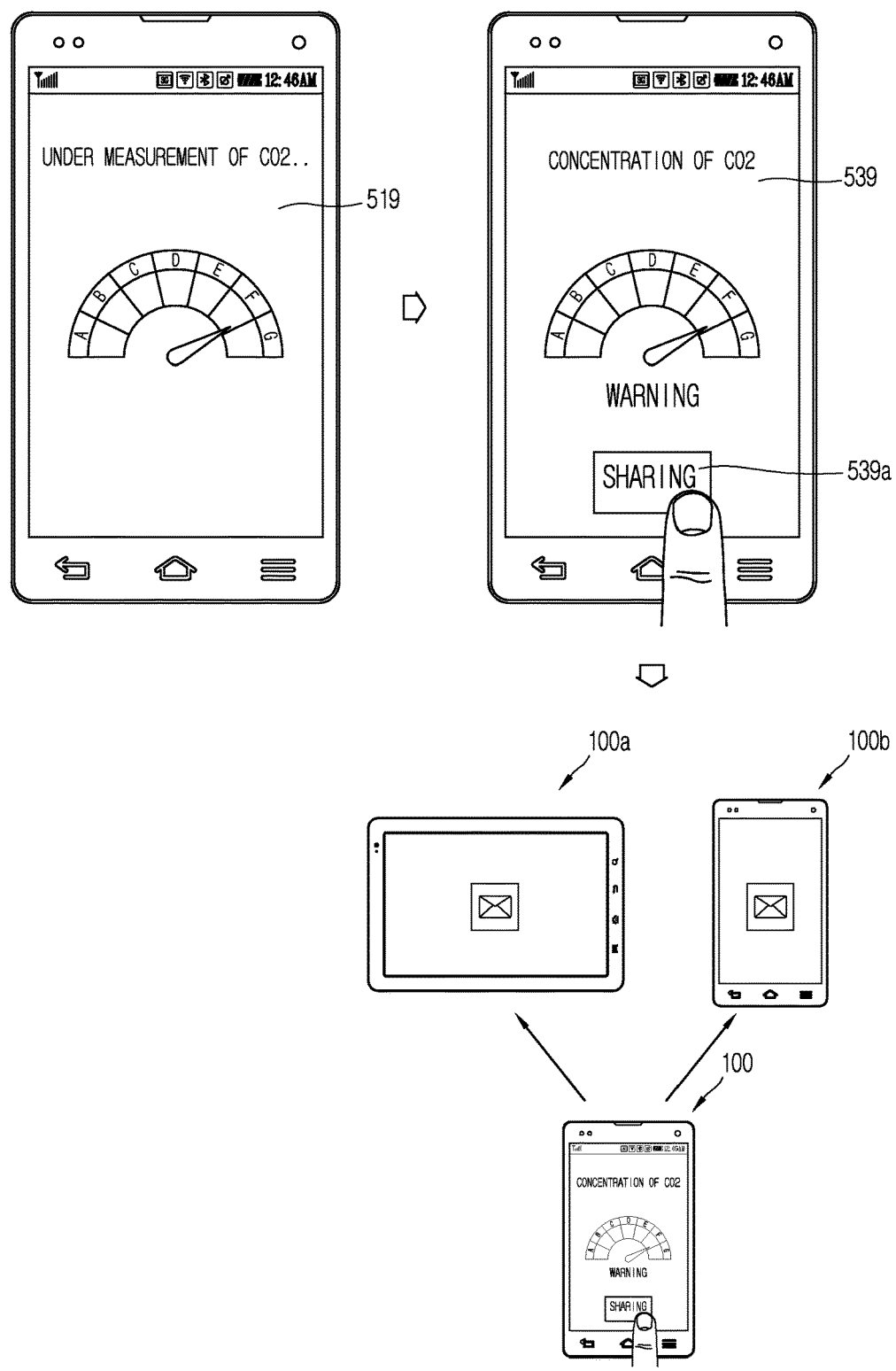

MOBILE TERMINAL AND METHOD FOR CONTROLLING THE SAME

CROSS-REFERENCE TO RELATED APPLICATION

Pursuant to 35 U.S.C. § 119, this application claims the benefit of earlier filing date and right of priority to Korean Patent Application No. 10-2016-0084283, filed on Jul. 4, 2016, and also claims the benefit of U.S. Provisional Application No. 62/328,625, filed on Apr. 28, 2016, the contents of which are all hereby incorporated reference herein in their entirety.

BACKGROUND OF THE INVENTION

1. Field of the Invention

This specification relates to a mobile terminal having a gas sensor.

2. Background of the Invention

A mobile terminal includes all types of devices provided with a battery and a display unit and carried by a user, the devices configured to output information to the display unit using power supplied from the battery. The mobile terminal includes a device for recording and playing moving images, a device for displaying a graphic user interface (GUI), etc., which includes a notebook, a mobile phone, glasses, a watch, a game console, etc.

Such mobile terminal has become increasingly more functional. Examples of such functions include data and voice communications, capturing images and video via a camera, recording audio, playing music files via a speaker system, and displaying images and video on a display. Some mobile terminals include additional functionality which supports game playing, while other mobile terminals are configured as multimedia players.

Efforts are ongoing to support and increase the functionality of mobile terminals. Such efforts include software and hardware improvements, as well as changes and improvements in the structural components.

As functions of the mobile terminal become diversified recently, being developed are various techniques to care a user's health by providing information on an environmental state to the user. Especially, as air pollution increases and a larger amount of chemical materials are used, needs to check a current air state immediately are increased. In order to satisfy the needs, a user should select a desired type among various types of gas, and should apply a control command to sense the selected type of gas. This may cause user's inconvenience.

SUMMARY OF THE INVENTION

Therefore, an aspect of the detailed description is to provide a mobile terminal having a gas sensor module for detecting a suitable type of gas while the mobile terminal is used.

To achieve these and other advantages and in accordance with the purpose of this specification, as embodied and broadly described herein, there is provided a mobile terminal, including: a terminal body provided with a case having at least one hole; a gas sensor module disposed near the case, and configured to sense specific gas by air introduced through the hole; and a controller configured to set a type of gas to be sensed based on an activated specific function, and to control the gas sensor module to sense the gas.

In an embodiment of the present invention, the specific function may be at least one of a call function, a position information acquiring function, and a wireless connection function with a vehicle. And a type of gas corresponding to the specific function may be sensed. This may allow a user to be provided with desired sensing information by sensing a suitable type of gas without selecting a type of gas at each situation.

In an embodiment of the present invention, since sensing information of gas is stored together with position information of the mobile terminal, a user may check an air state at a corresponding position.

In an embodiment of the present invention, since the gas sensing module is activated based on stored data, a user may be provided with sensing information of gas when necessary, without applying an additional control command.

In an embodiment of the present invention, since the gas sensing module is activated based on a specific function, a user may be provided with sensing information of gas without applying an additional control command.

Since sensing information of gas is stored together with position information, an image, etc. to be shared, a user may be provided with more precise data.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 6A to 6C are conceptual views illustrating a control method for sensing preset gas based on a position of a mobile terminal according to another embodiment of the present invention;

FIG. 11 is a conceptual view illustrating a control method for sharing sensing information.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1A:
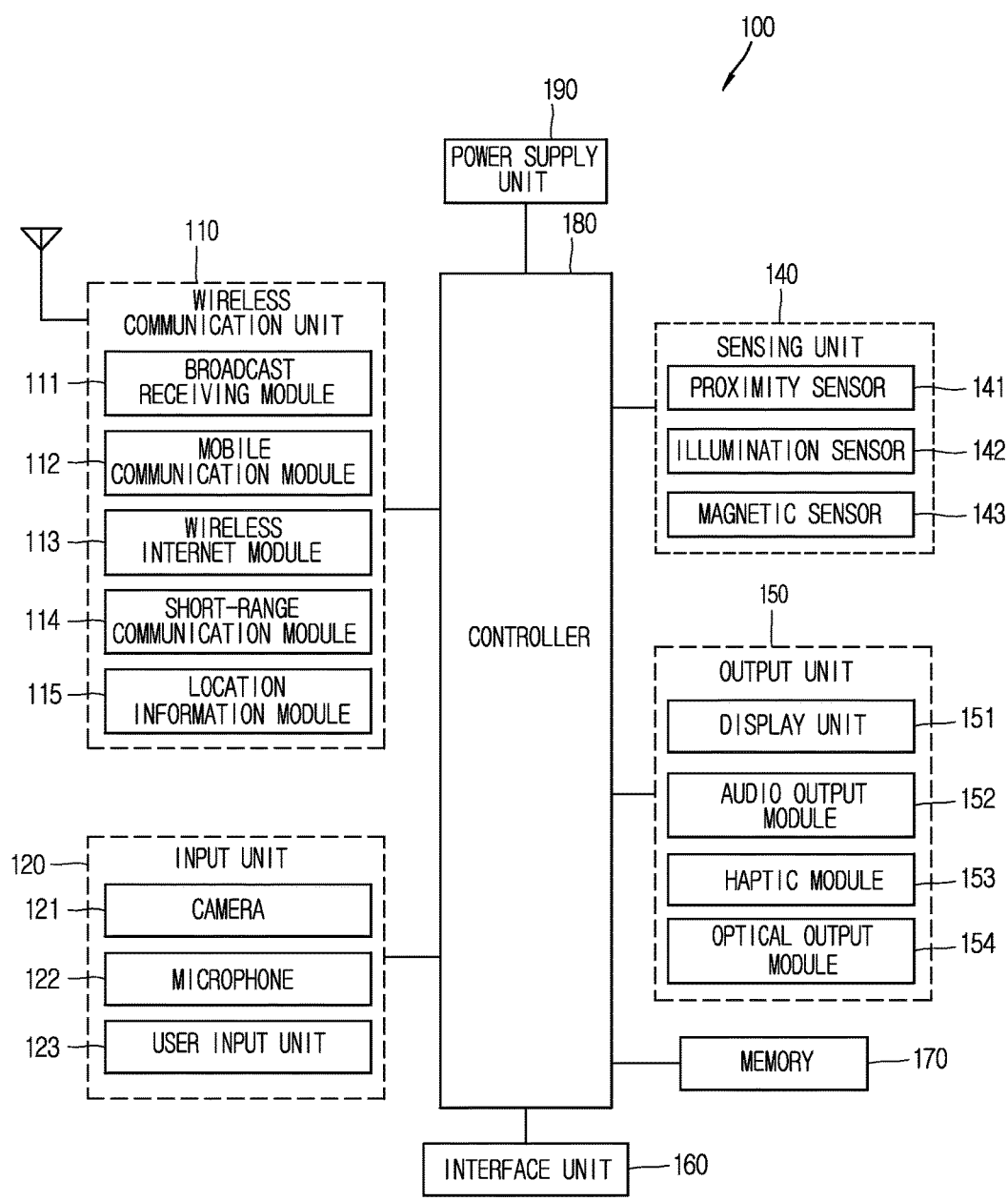
FIGS. 1A to 1C are block diagrams of a mobile terminal in accordance with one exemplary embodiment of the present invention.
Figure 1B:
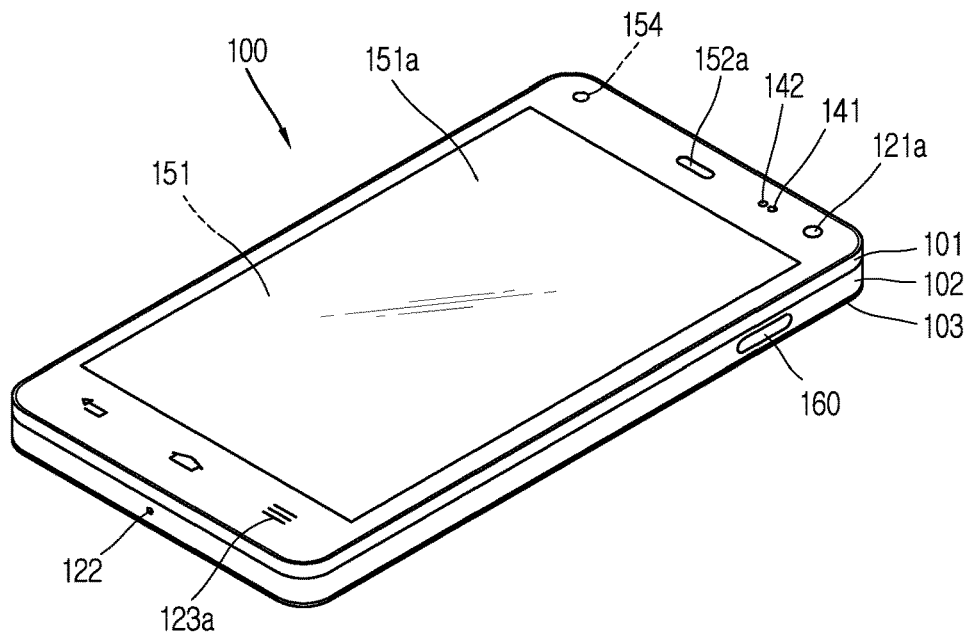
Figure 1C:
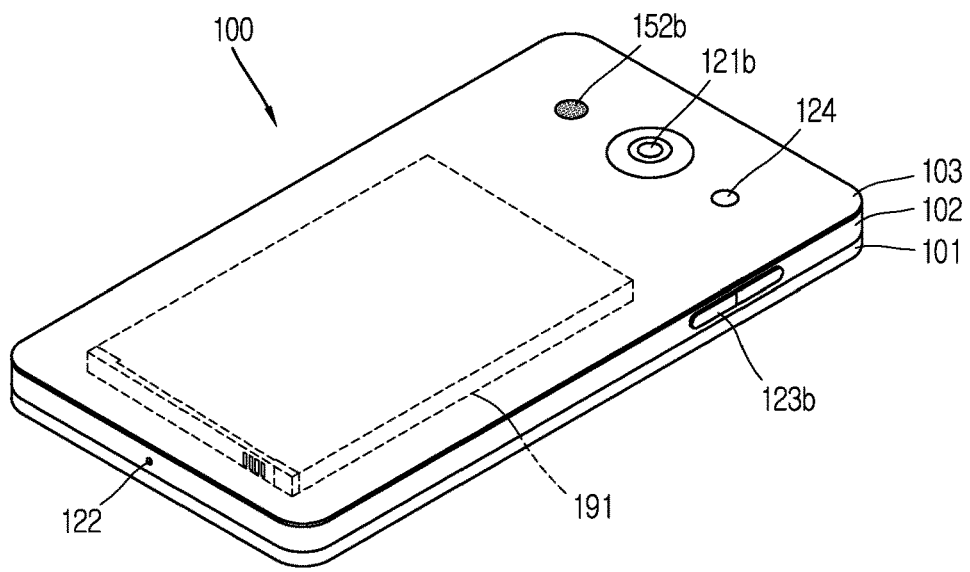

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA(High Speed Uplink Packet Access), Long Term Evolution (LTE), LTE-A(Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB(Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

A magnetic sensor 143 indicates a sensor configured to detect an object approaching a predetermined surface or an object which exists nearby, and a position and a direction of the object, using a force of a magnetic field. That is, the magnetic sensor 143 indicates a sensor configured to measure a size and a direction of a peripheral magnetic field or a line of magnetic force.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap)

touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit.

When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a, Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

Figure 10A:
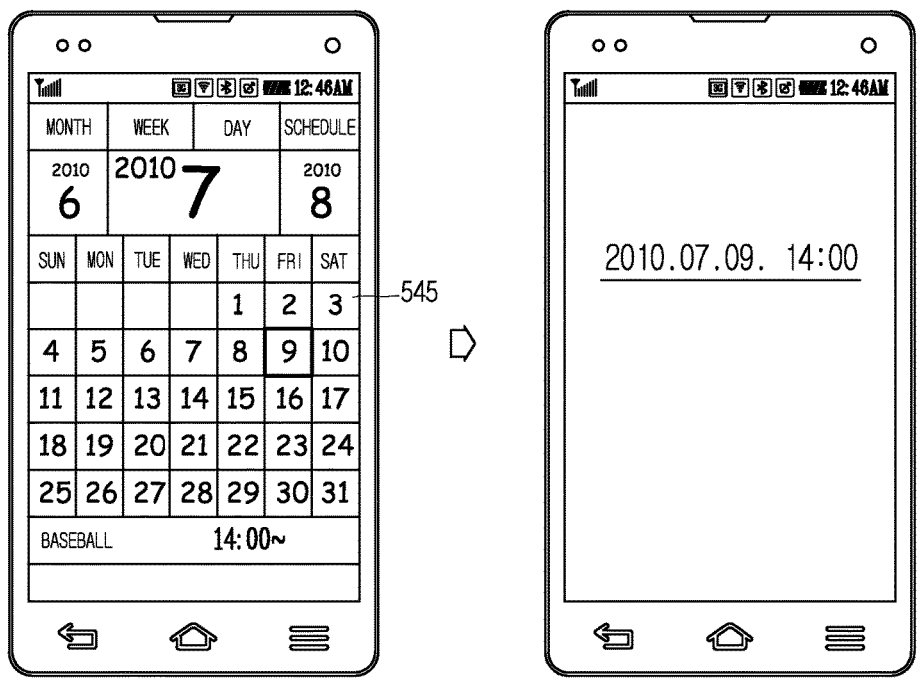
FIGS. 10A and 10B are conceptual views illustrating a control method for controlling a gas sensor module based on stored information.
Figure 10A:
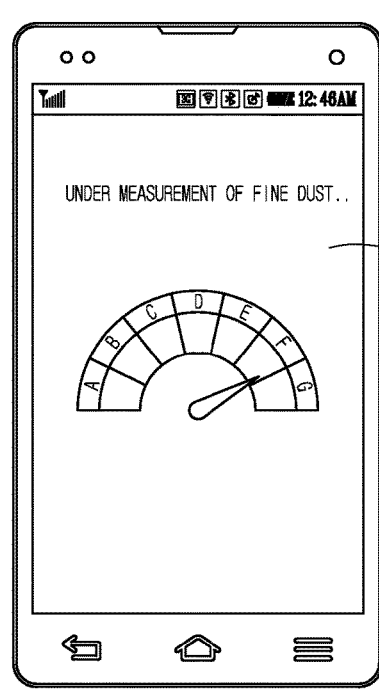

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 1D:
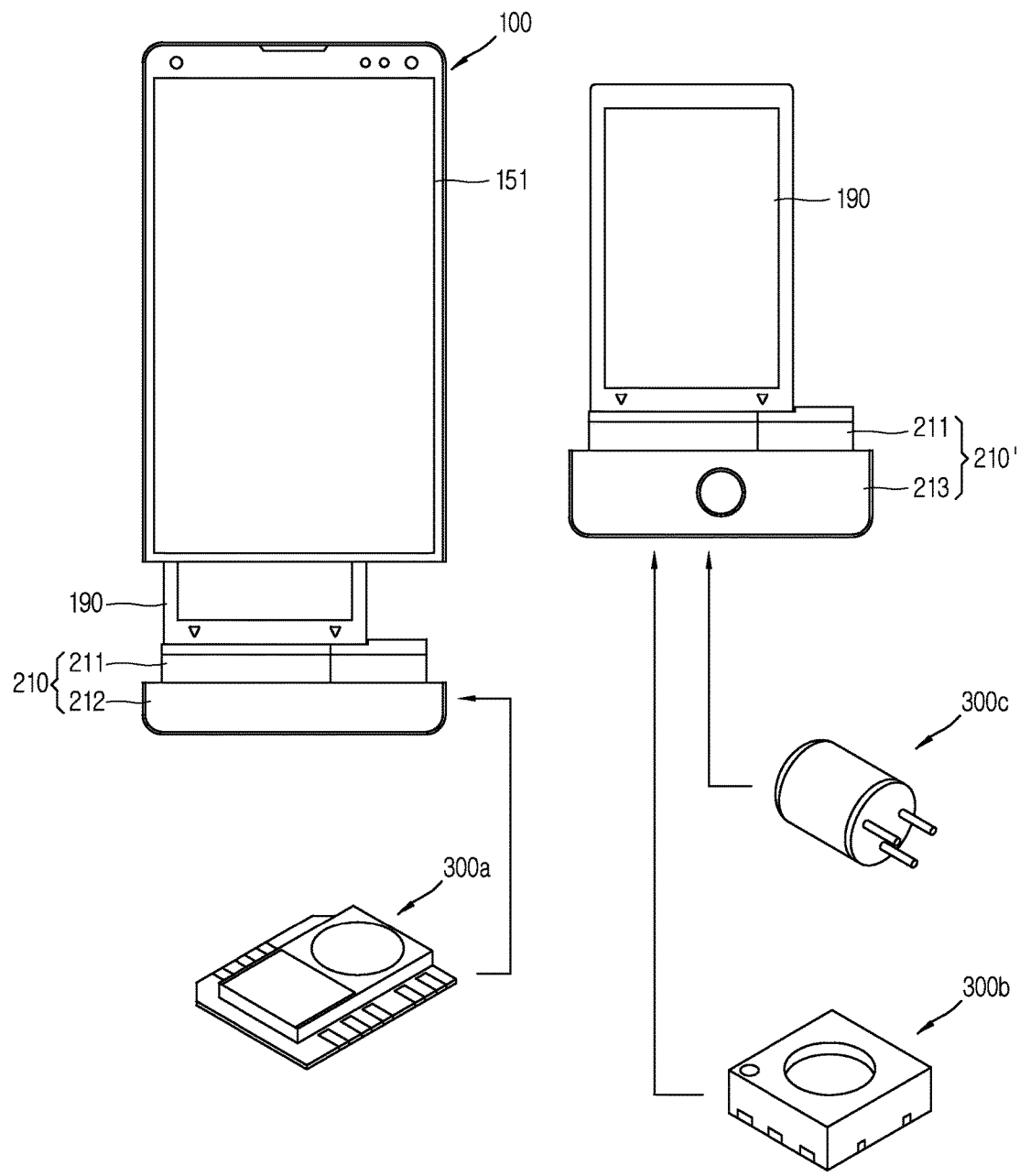
FIG. 1D is a conceptual view of a mobile terminal having a gas sensor according to another embodiment of the present invention.

FIG. 1D is a conceptual view of the mobile terminal having a gas sensor according to another embodiment of the present invention.

Referring to FIG. 1D, the mobile terminal 100 includes a terminal body, and a sub body 210 mounted to one end of the terminal body in a detachable manner. Various types of electronic components including the display unit 151 are disposed on the terminal body. The terminal body has an inner space where the power supply unit 190 for supplying power is disposed.

The power supply unit 190 is detachably fixed to the sub body 210. The sub body 210 is fixed to the terminal body so as to cover the inner space. The sub body 210 includes a second body 212 which forms appearance when coupled to the terminal body; and a first body 211 protruding from the second body 212, disposed at the inner space of the terminal body, and to which the power supply unit 190 is fixed.

A first sensor module 300a may be mounted to the sub body 210. The first sensor module 300a may be configured as a sensor for measuring a concentration of harmful gas which may badly influence on the human body. For instance, the first sensor module 300a may be a sensor for measuring a concentration of a volatile organic compound (TVOC) in the air and/or a concentration of carbon dioxide ($CO_2$). The sub body 210 may be provided with an inner space where the first sensor module 300a formed as a single module is mountable.

The mobile terminal 100 includes the terminal body and the sub body 210. And the sub body 210 includes a functional body 213 having electronic components for executing specific functions, and the first body 211 protruding from the functional body 213, and to which the power supply unit 190 is fixed. The functional body 213 and the second body 212 may be formed to be different from each other in shape and size.

The functional body 213 may be also provided with an inner space where a second sensor module 300b for sensing a concentration of a volatile organic compound (TVOC) in the air and/or a third sensor module 300c for sensing a concentration of alcohol are mounted.

The first to third sensor modules 300a, 300b, 300c may be formed to be integral with or to be separated from the second body 212 and the functional body 213. In a case where the first to third sensor modules 300a, 300b, 300c are integrally formed with the second body 212 and the functional body 213, the sub body 210 may be separated from the terminal body, and then a sub body 210' having therein a sensor module for sensing a desired type of gas may be mounted to the terminal body.

On the other hand, if the first to third sensor modules 300a, 300b, 300c are formed to be separated from the second body 212 and the functional body 213, a user may mount a sensor module for sensing a desired type of gas. A different type of sensor module for sensing a different type of gas may be fixed to the functional body 213.

The different type of sensor module for sensing a different type of gas may be provided with sensors different from each other in shape.

Unlike in the drawings, the sensor module may be disposed at the inner space of the terminal body. For instance, the sensor module may be attached to the inner space of the terminal body 100, the inner space exposed to the outside after the power supply unit 190 is separated from the terminal body.

In this embodiment, the gas sensor module for sensing a different type of gas may be replaced, by using the detachable sub body formed to expose the inner space of the terminal body. This may allow a user to acquire desired information by additionally purchasing a required sensor module.

Figure 2A:
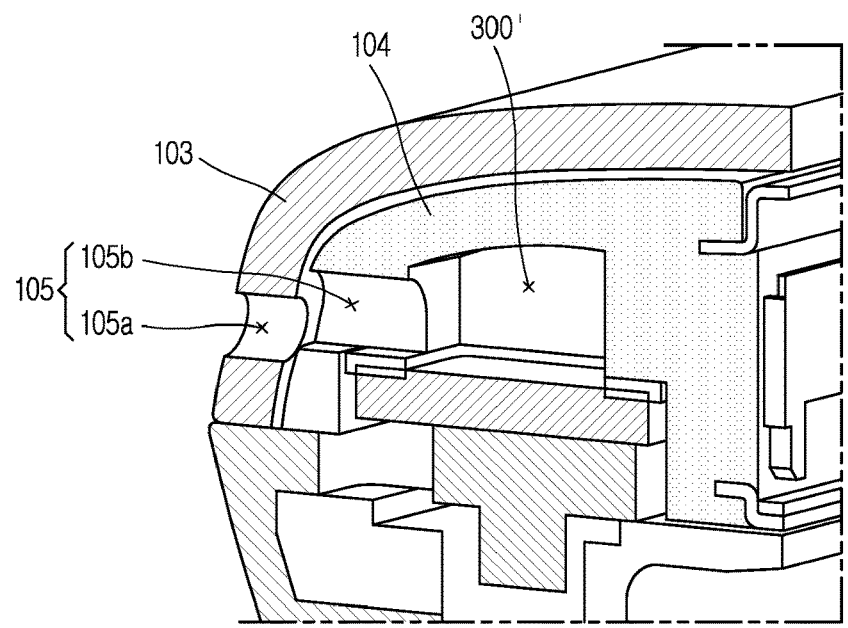
FIGS. 2A and 2B are conceptual views illustrating an inner structure of a mobile terminal including a sensor module disposed on one region of the mobile terminal shown in FIG. 1B.
Figure 2B:
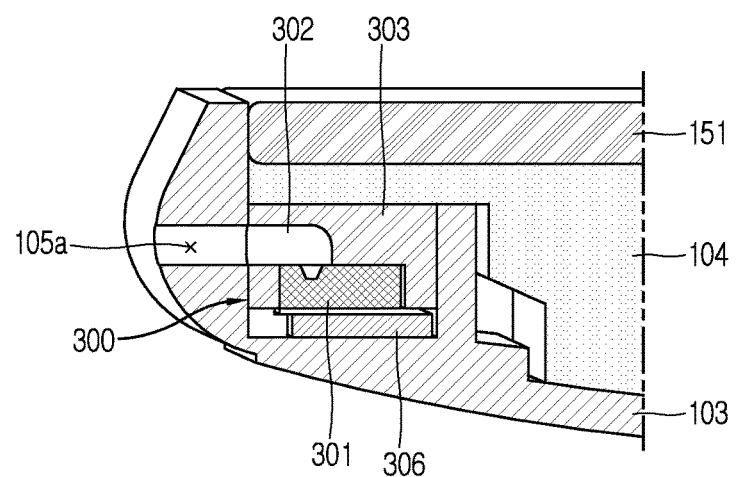

FIGS. 2A and 2B are conceptual views illustrating an inner structure of the mobile terminal including a sensor module disposed on one region of the mobile terminal shown in FIG. 1B.

FIG. 2A is a conceptual view illustrating an inner structure of the mobile terminal including a sensor module disposed at a region close to the rear cover 103. The mobile terminal 100 includes an accommodation region 300' to mount the gas sensor module in the rear cover 103 and an inner frame 104 coupled to the rear cover 103.

The rear cover 103 which forms appearance of the mobile terminal 100 may be formed to be separable from the inner frame 104. The rear cover 103 and the inner frame 104 include an air hole 105 having first and second holes 105a, 105b connected to the accommodation region 300'. External air may reach the accommodation region 300' through the first hole 105a of the rear cover 103 and the second hole 105b, sequentially.

FIG. 2B illustrates a gas sensor module 300 mounted to the accommodation region formed by the rear cover 103 and the inner frame 104.

Once the rear cover 103 and the inner frame 104 are separated from each other, the gas sensor module 300 may be exposed to the outside, and the gas sensor module 300 may be replaceable by another gas sensor module including another type of gas sensor.

The gas sensor module 300 includes a gas sensor 301, an accommodation cap 303 configured to accommodate the gas sensor 301 therein, a conductive member 306, and a flexible printed circuit board. The gas sensor 301 is accommodated at an inner space of the accommodation cap 303, and the accommodation cap 303 includes a gas hole 302 communicated with the first hole 105a of the rear cover 103.

The accommodation cap 303 may be formed to have the same shape as the accommodation region formed by the rear cover 103 and the inner frame 104. The accommodation cap 303 may be formed of a rubber material elastically transformable so as to prevent damage of the gas sensor 301, and so as to be replaceable in the mobile terminal 100.

The gas sensor module may disperse heat emitted from the mobile terminal 100, since it may acquire a maximum distance from other electronic components in an arranged state near the rear cover 103. Although not shown, the gas sensor module is preferably disposed at a region close to a lower end or a side surface which is less influenced by a temperature and a humidity of the mobile terminal 100, and which is less influenced by heat emitted from the inside of the mobile terminal.

The gas sensor 301 may be any type of gas sensor. For instance, the gas sensor 301 may be configured to detect a carcinogen such as benzene, toluene and formaldehyde which cause a sick house syndrome, to detect harmful gas such as ammonia or methane in order to check spoilage of food, or to detect indoor harmful gas by sensing poisonous gas inside a public place. The gas sensor 301 may be configured to measure an indoor or outdoor air cleanliness by sensing carbon monoxide (CO), carbon dioxide ($CO_2$), ozone, nitrogen dioxide ($NO_2$), etc., or may be configured to sense a temperature and a humidity. The gas sensor 301 may be configured to detect gas emitted from a human's body. For instance, the gas sensor 301 may be configured to detect diseases by sensing bad breath and infections inside the body, or may be configured to measure a driver's blood alcohol level. And the gas sensor 301 may be configured to detect a specific type of gas in order to discern wine, or may be configured to detect a specific type of gas in order to measure sugar contents of fruits and to sense agricultural pesticides.

The gas sensor module 300 may comprise first and second gas sensors mounted in the accommodation cap 303.

The first and second gas sensors may be formed to detect the same type of gas. Power may be applied to the first gas sensor to detect gas. Then, if the lifespan of the first gas sensor is terminated, power may be applied to the second gas sensor.

The first and second gas sensors may be formed to detect different types of gas, and may be formed to be different from each other in size and shape. The gas sensors of the present invention may have any types. For instance, the gas sensors may be configured to detect a carcinogen such as benzene, toluene and formaldehyde which cause a sick house syndrome, to detect harmful gas such as ammonia or methane in order to check spoilage of food, or to detect indoor harmful gas by sensing poisonous gas inside a public place. Alternatively, the gas sensors may be configured to measure an indoor or outdoor air cleanliness by sensing carbon monoxide (CO), carbon dioxide ($CO_2$), ozone, nitrogen dioxide ($NO_2$), etc., or may be configured to sense a temperature and a humidity. Alternatively, the gas sensors may be configured to sense gas emitted from a human's body. For instance, the gas sensors may be configured to check diseases by sensing bad breath and infections inside the body, or may be configured to measure a driver's blood alcohol level. Alternatively, the gas sensors may be configured to discern wine, or may be configured to detect a specific type of gas in order to measure sugar contents of fruits and to sense agricultural pesticides.

Figure 3A:
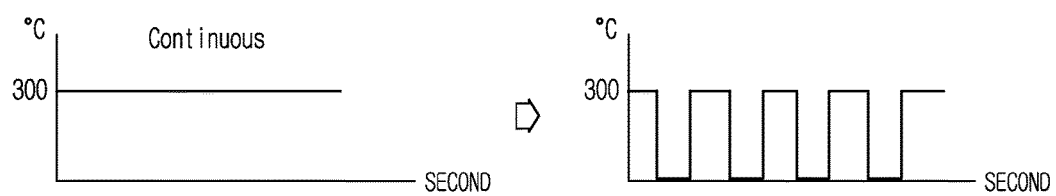
FIGS. 3A and 3B are conceptual views illustrating a control method for driving a heater of a gas sensor according to an embodiment of the present invention.
Figure 3B:
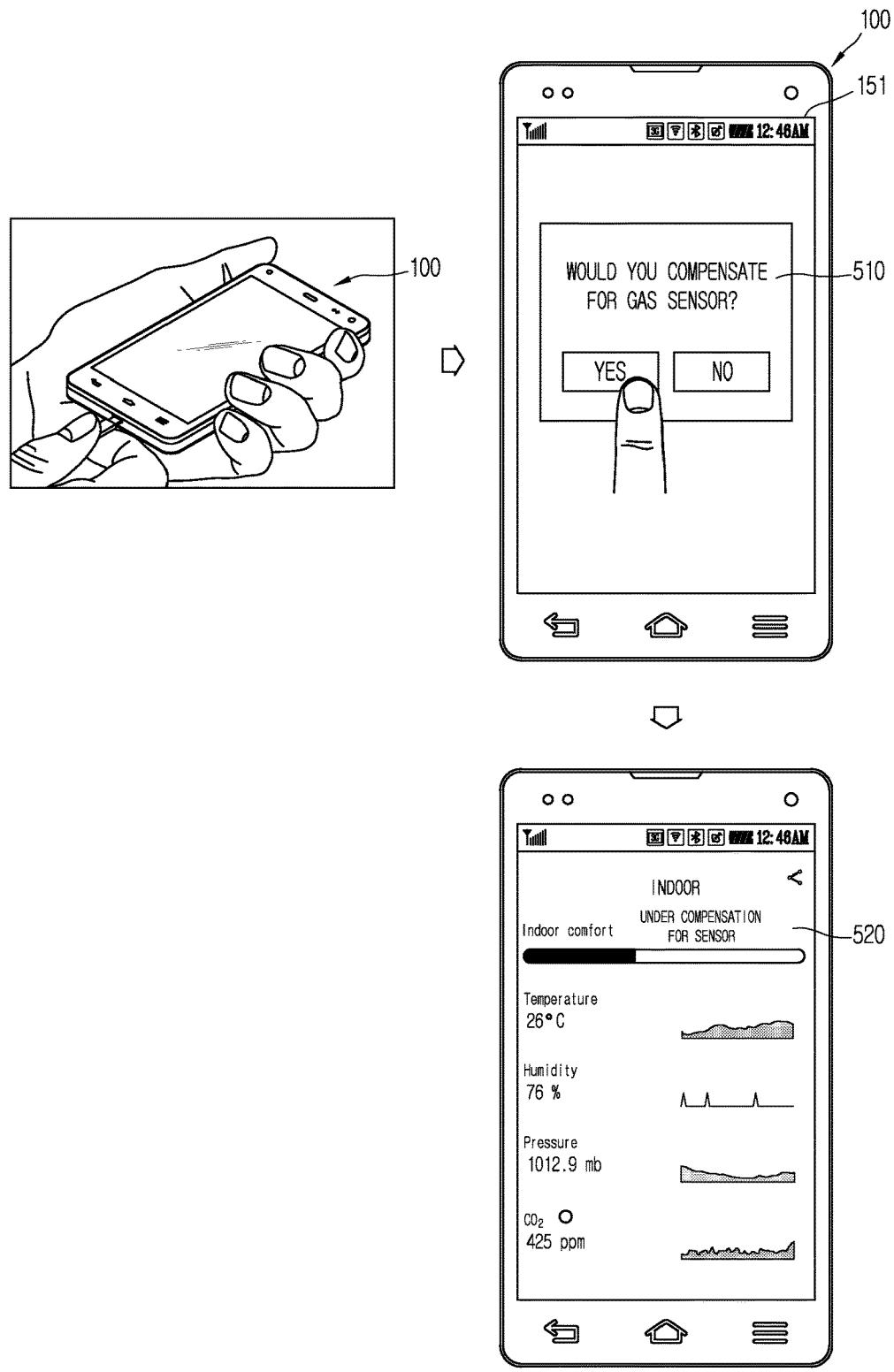

FIGS. 3A and 3B are conceptual views illustrating a control method for driving a heater of a gas sensor according to an embodiment of the present invention.

The gas sensor included in the mobile terminal 100 according to the present invention may be formed as a semiconductor gas sensor. The semiconductor gas sensor applies a voltage in order to heat a heater, and detects gas by using a change of an electrical resistance occurring when the gas contacts the surface of the semiconductor gas sensor formed of a ceramic semiconductor material.

The controller 180 does not continuously turn on the heater for maintenance of a temperature, but turns on the heater at specific time periods. That is, the controller 180 controls the heater to maintain a temperature for sensing the gas in the form of pulses. This may minimize power consumption for driving the heater.

Referring to FIG. 3B, the controller 180 controls the heater to be continuously turned on when the mobile terminal 100 is not used or when power consumption is minimum. On the other hand, the controller 180 controls the heater to be turned on at specific time periods when the mobile terminal 100 is being used or when power consumption of the mobile terminal 100 is more than a preset value.

The controller 180 controls on/off of the heater such that the heater is heated at preset time periods. A baking function corresponds to a burn-in function to drive the heater for a specific time (about 24-48 hours) at an initial stage to ensure a stable driving of the gas sensor. Once the baking function is executed, gas particles attached to a sensing material of the gas sensor are separated.

For instance, when the power supply unit 190 of the mobile terminal 100 is in a charging state, the controller 180 controls the display unit 151 to output a confirmation window 510 to confirm a compensation state of a sensing function of the gas sensor 301 for execution of the baking function.

The confirmation window 510 may be output when a charging terminal is connected to the interface unit 160 in order to charge the power supply unit 190, or when the power supply unit 190 is converted into a wireless charging state. Once a control command to compensate for sensing information by the gas sensor is applied to the confirmation window 510, the controller 180 turns on the heater at a temperature more than a specific temperature for the baking function, and separates the gas particles attached to the sensing material.

While the burn-in function is executed, the display unit 151 may compensate for sensing information, and may output a compensation screen 520. The compensation screen 520 includes a status bar indicating that the burn-in function is being executed or the sensing information is being compensated, and may include data sensed by the gas sensor module 300 (e.g., a temperature, a humidity, a concentration of carbon dioxide, etc.) and data sensed by other sensor (e.g., a pressure, an altitude, a position, a time, a date, etc.).

The controller 180 may execute the baking function at a time when the mobile terminal 100 is less used. For instance, the controller 180 may detect a user's sleeping time, or may execute the baking function at a time when the mobile terminal 100 is less used.

This may allow the baking function to be executed at a time when power consumption is low. As a result, power of the mobile terminal 100 may be efficiently used, and thus quality of the gas sensors may be enhanced.

Figure 4A:
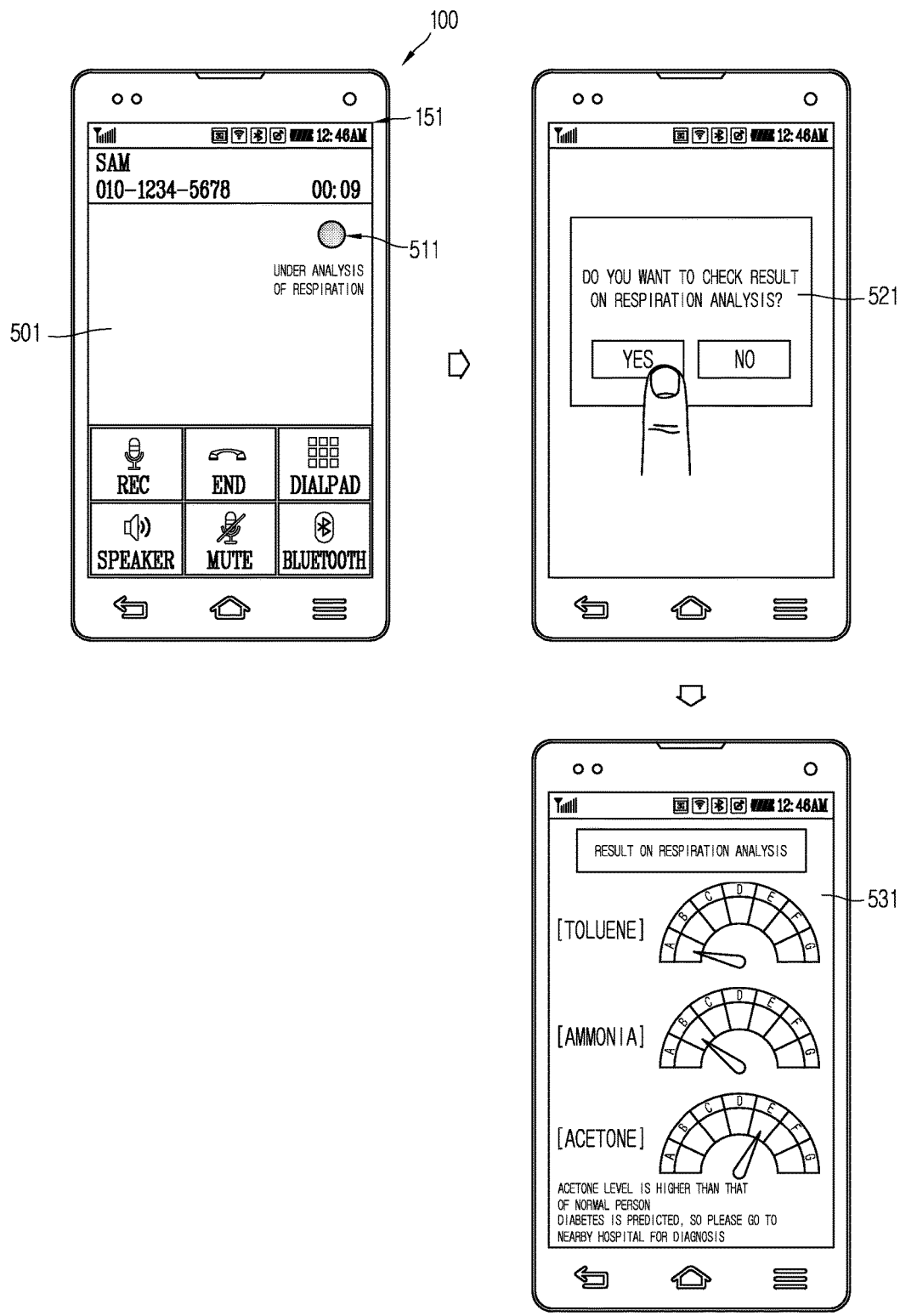
FIGS. 4A to 4C are conceptual views illustrating a control method for sensing gas included in respiration according to an embodiment of the present invention.
Figure 4B:
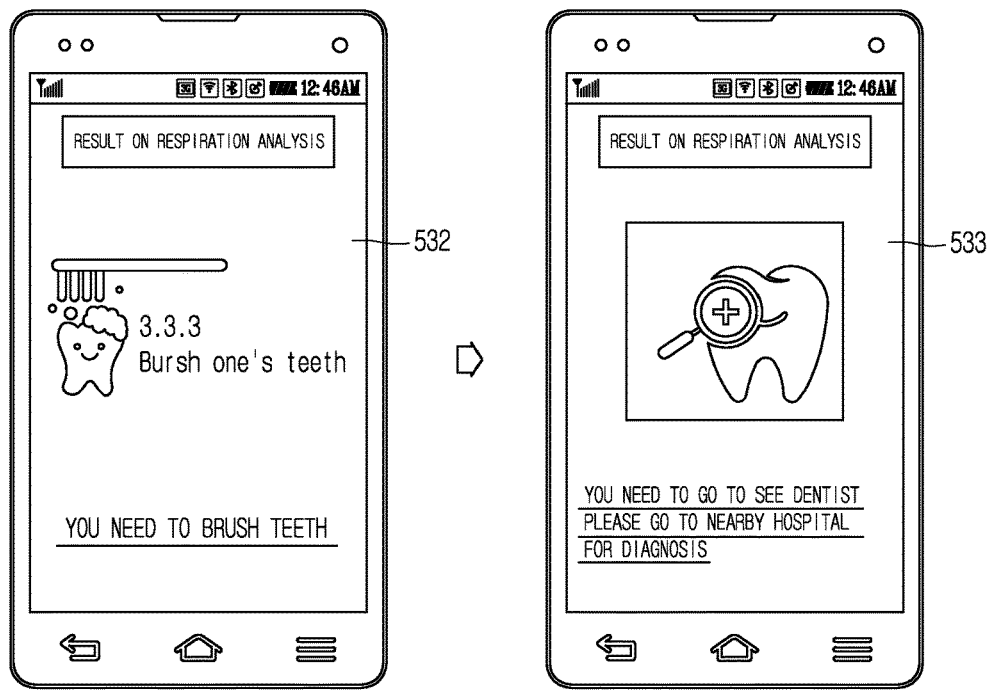
Figure 4C:
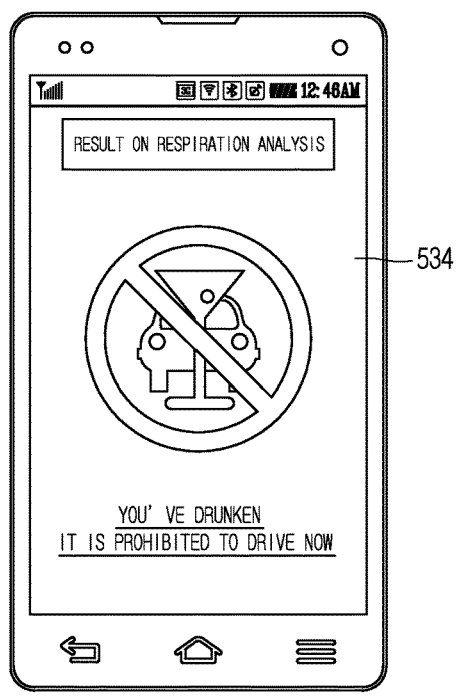

FIGS. 4A to 4C are conceptual views illustrating a control method for sensing gas included in respiration according to an embodiment of the present invention.

Referring to FIG. 4A, the controller 180 may control the gas sensor module 300 to sense gas while a call function is executed. When the call function is executed, the display unit 151 outputs a call screen 501. And when the gas sensor module 300 is activated, a first sensing image 511 indicating a sensing function is being executed is output to the call screen 501. If the gas sensor module 300 includes gas sensors which detect various types of gas, the controller controls the gas sensor module 300 to detect only gas corresponding to the call function.

The controller 180 controls the gas sensor module 300 based on an execution state of the call function, without a user's specific control command. Once the gas sensor module 300 is activated, the controller 180 may control the output unit 150 to output audible data and/or vibration indicating the activated state of the gas sensor module 300.

The controller 180 may activate the gas sensor module 300 when the call function is executed, or when a user's face and so on are close to the mobile terminal 100 while the call function is being executed. Alternatively, the controller 180 may activate the gas sensor module 300 only when the mobile terminal executes wireless communication with a specific external device. While the call function is being executed, the gas sensor module 300 senses gas related to a human's disease among various types of gas. For instance, the gas related to a human's disease may be VOC gas such as acetone, toluene, nitrogen monoxide and ammonia. The gas may correspond to bio markers of diabetes, pneumonia, asthma and a kidney disease, respectively.

Once the gas sensing from a user's respiration by the gas sensor module 300 is completed, the controller 180 controls the display unit 151 to display a first result image 521. The first result image 521 may be displayed on the display unit 151 when the call function is completed. The first result image 521 may be output together with a termination screen of the call function, but the present invention is not limited to this. For instance, the first result image 521 may be output in the form of a pop-up window or an event notification.

The first result image 521 includes information indicating that specific gas has been sensed, and a graphic image (YES/NO) for receiving a touch input to apply a control command indicating confirmation of the information.

The controller 180 controls the display unit 151 to output a first result screen 531, based on a touch input applied to the first result image 521. The first result screen 531 may include a result on a concentration of specific gas sensed by the gas sensor module 300, and an analysis result on the sensing information. The analysis result on the sensing information may include disease information related to a user's health, guide information for improving related diseases, etc.

The controller 180 compares the information acquired by the gas sensor module 300, with a specific reference value. In this case, the controller 180 controls the display unit 151 to output the first result image 521 only when the information is out of a reference range, or when a change more than the specific reference value occurs.

In this embodiment, once a call function is executed without a user's control command, a specific type of gas may be detected from user's respiration. Thus, gas included in the user's respiration may be detected while the mobile terminal 100 is being used, even if the user does not undergo a health state measurement through detection of gas included in respiration. This may allow the user to be provided with health information through respiration unconsciously.

Referring to FIGS. 4B and 4C, the display unit 151 outputs a second result screen 532 formed based on the sensing information. The second result screen 532 does not indicate a numerical value of measured gas, but includes guide information for enhancement of a user's health based on the sensing information.

The controller 180 may control the display unit 151 to output a third result screen 533 according to a health state based on the numerical value of the measured gas. The third result screen 533 may include warning information notifying a need for treatment or diagnosis when the sensing information of the specific gas is out of a reference range indicating a healthy state. For instance, the third result screen 533 may include data related to the degree of risk of a disease, hospital information, etc. The reference range indicating a healthy state may be pre-stored in the memory 170, or may be received from a specific server.

Referring to FIG. 4C, the controller 180 controls the display unit 151 to output a fourth result screen 534 including information on warning of a behavior, based on the sensing information. For instance, the fourth result screen 534 may include warning information to prevent a drunk driving based on an alcohol level. The controller 180 controls the display unit 151 to display the fourth result screen 534 for a specific time at specific time periods.

That is, the controller 180 displays different result information, based on a type and a numerical value of sensed gas. This may allow a user to be provided with guide information for health, as well as a numerical value of gas included in respiration.

FIGS. 5A to 5D are conceptual views illustrating a control method for sensing gas based on position information according to another embodiment of the present invention.

Figure 5A:
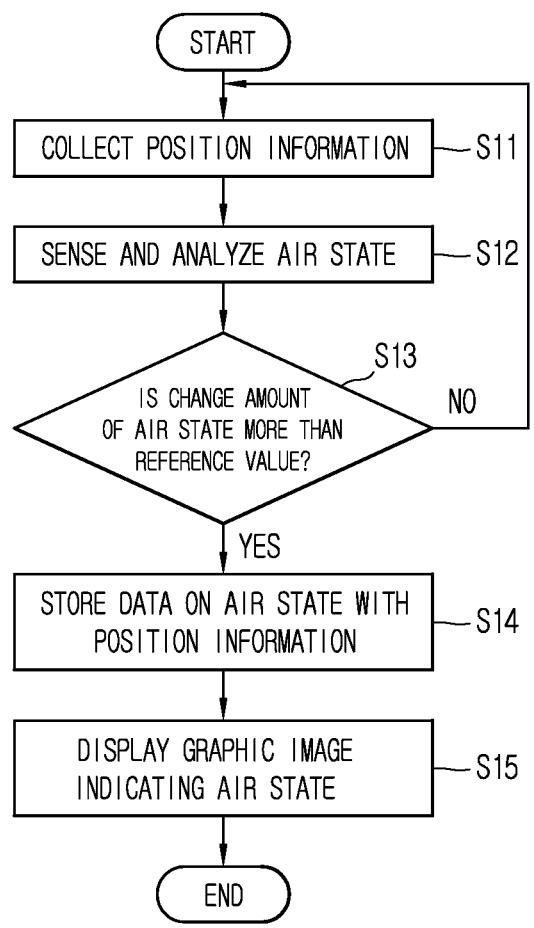
FIGS. 5A to 5D are conceptual views illustrating a control method for sensing gas based on position information according to another embodiment of the present invention.

Referring to FIG. 5A, the location information module 115 collects position information (S11). The controller 180 receives the position information when a specific function (e.g., a GPS function, a navigation function, a route search function, etc.) is executed, or once per specific time period.

Figure 5B:
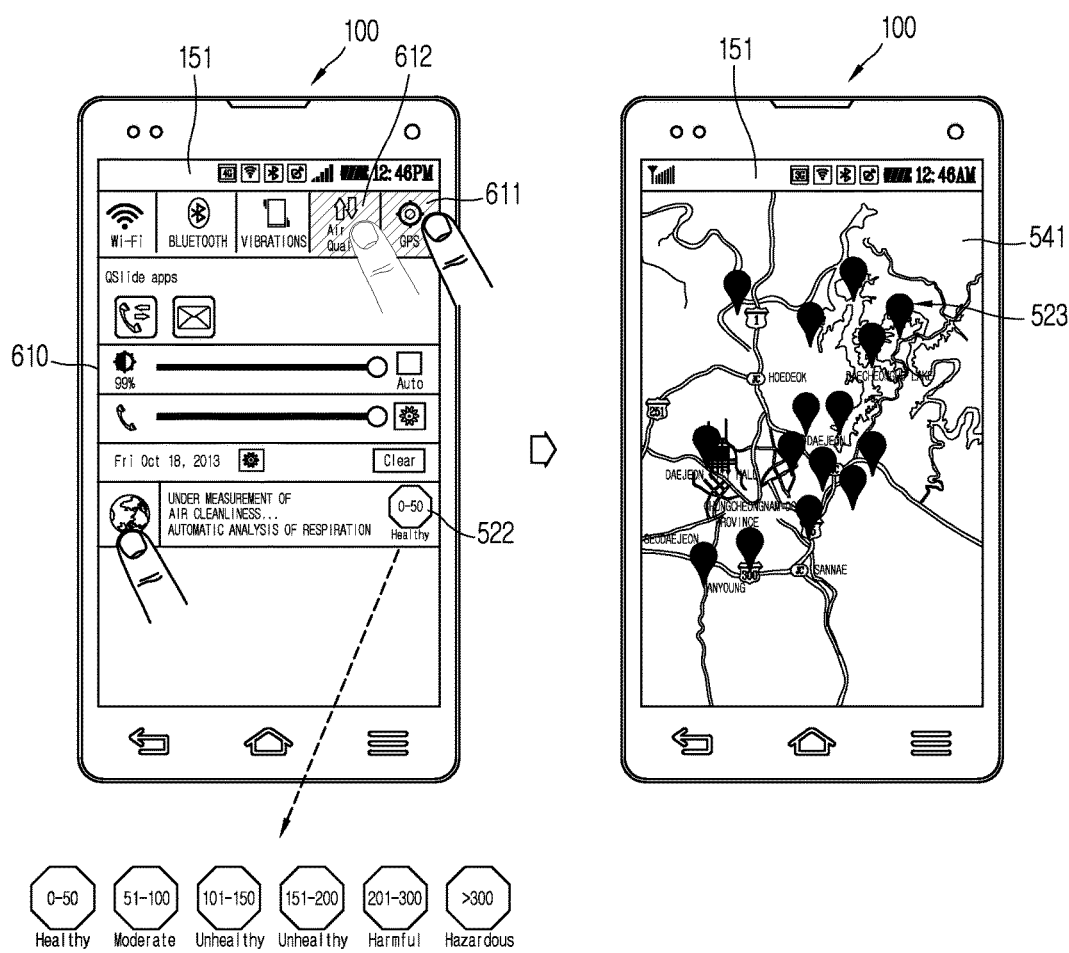

Once the position information is collected or a preset control command is applied to the mobile terminal 100, the controller 180 senses an air state and analyzes the sensed air state (S12). Referring to FIG. 5B, the controller 180 may activate a position information collection function and a gas sensing function on a state display screen 610. The state display screen 610 may include a first setting icon 611 for receiving a touch input in order to activate the position information collection function, and a second setting icon 612 for receiving a touch input in order to activate the gas sensing function. The state display screen 610 may further include a second result image 522 indicating collected sensing information based on the gas sensing function. The second result image 522 may be displayed on a notification image indicating occurrence of an event. The second result image 522 may correspond to a graphic image indicating an analysis result of the sensing information, or a graphic image indicating the sensing information as a numerical value.

The controller 180 determines whether a change degree of the air state is more than a reference value or not (S13). If the change degree of the air state is more than the reference value, i.e., if the sensing information is greatly different from previous sensing information, the controller 180 controls the memory 170 to store therein the position information and data on the air state(S14).

The controller 180 displays a graphic image indicating the air state (S15).

Referring to FIG. 5B, if the change degree of the air state is more than the reference value, the controller 180 may output an event notification bar including the second result image 522. The controller 180 may execute a specific application indicating an air state, based on a touch input applied to the event notification bar.

The second result image 522 may be an image indicating an air pollution level corresponding to an air quality. The image may be formed to have a different color, shape, etc., according to an air pollution level.

Based on a touch input applied to the event notification bar including the second result image 522, the position information and the data on the air state stored in the memory 170 are displayed on the display unit 151. For instance, the position information is displayed as a map screen 541, and a third result image 523 indicating an air state (sensing information) corresponding to each position information is displayed on the map screen 541. That is, an air state of a corresponding position may be displayed on a position of the map screen 541 where the third result image 523 has been output.

In this embodiment, since position information is also collected while a corresponding air state is sensed, the air state corresponding to the position may be stored. Thus, a user may be provided with an air state at a corresponding position.

Figure 5C:
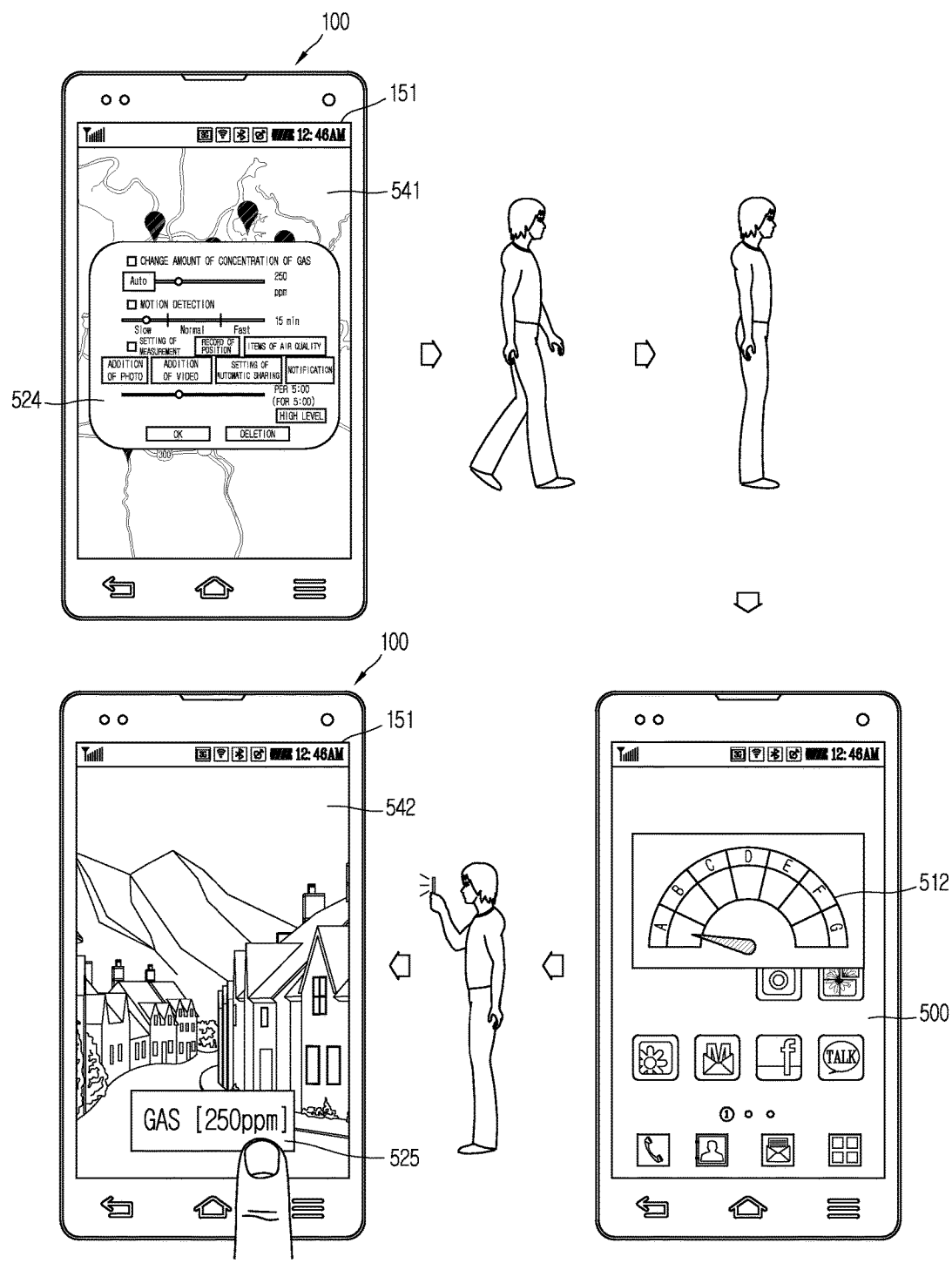

Referring to FIG. 5C, the display unit 151 may display a fourth result image 524 indicating a currently-measured air state (sensing information) on the map screen 541. The fourth result image 524 includes sensing information measured at a current position.

The controller 180 activates the gas sensor module 300 and the sensing unit based on a specific control command (menu) selected in an output state of the map screen 541. The sensing unit senses a movement, a rotation, an acceleration, etc. of the mobile terminal 100. The controller 180 may display a movement of the mobile terminal 100 sensed by the sensing unit, on the fourth result image 524.

The fourth result image 524 may include a setting for setting a function related to the gas sensing function. For instance, the setting may include a photo addition, a video addition, a sharing setting, a notification (and a setting of a notification period), a gas sensing period, etc. In case of setting a photo addition function, once the gas sensor module 300 is activated, the controller 180 may activate the camera 121 for capturing an image.

If a movement more than a specific value is sensed by the sensing unit, the controller 180 controls the gas sensor module 300 to postpone its gas sensing function. On the other hand, if a movement less than the specific value is sensed by the sensing unit, the controller 180 controls the gas sensor module 300 to sense gas. Once the gas sensor module 300 is activated, the display unit 151 displays a second sensing image 512. For instance, the specific value may correspond to a case where a movement of the mobile terminal 100 has not been sensed for a specific time (about 15 minutes).

The second sensing image 512 may be displayed on a home screen page 500 in the form of a pop-up window, and may be displayed together with the map screen 541.

The controller 180 activates the camera 121 as the gas sensor module 300 is activated according to a user's setting. The controller 180 controls the memory 170 to store therein sensing information measured by the gas sensor module 300, together with an image acquired by the activated camera 121.

The display unit 151 displays a fifth result image 525 formed by the gas sensor module 300, on a capturing image 542 acquired by the camera 121. Although not shown, the controller 180 may control the display unit 151 to display detailed information of the sensing information, position information, and detailed information of the capturing image 542, based on a touch input applied to the fifth result image 525.

If a touch input for selecting a specific position on the map screen 541 is applied, the controller 180 may control the display unit 151 to output the fourth result image 524 including the sensing information stored together with corresponding position information.

In this embodiment, since the gas sensor module is activated when a movement state of the mobile terminal 100 is stable, an air state around the mobile terminal 100 may be detected more precisely. Further, as an additional function is executed when an air state is measured, additional information may be stored together with the measured sensing information.

Figure 5D:
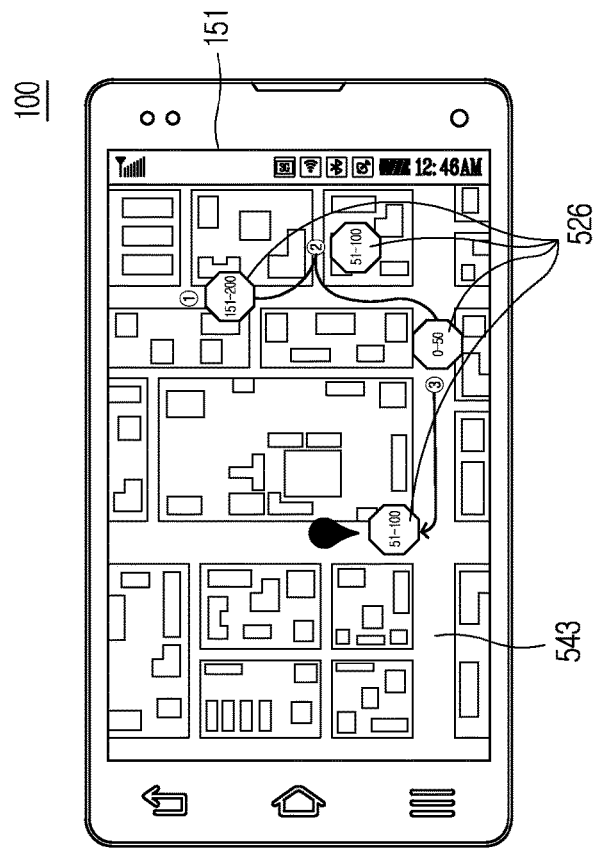
Figure 5D:
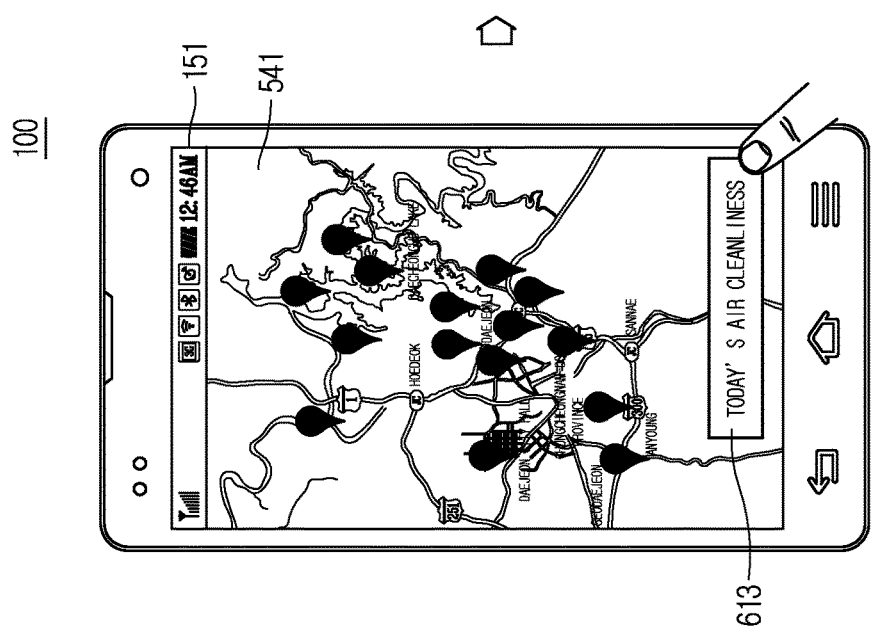

Referring to FIG. 5D, the display unit 151 may display a third setting icon 613 for receiving a touch input in order to display an additional air state, on the map screen 541. The map screen 541 may include position information on a position close to a current position, or may include information on a position movement of the mobile terminal 100.

The controller 180 controls the display unit 151 to display sensing information indicating a measured air state together with position information about a position change of the mobile terminal 100, based on a touch input applied to the third setting icon 613. For instance, the position information may indicate a position change of the mobile terminal 100 for one day (today).

The display unit 151 displays a moving path screen 543 indicating position information including a moving path of the mobile terminal 100, and displays a sixth result image 526 indicating the sensing information, on the moving path screen 543. The sixth result image is displayed on one region of the moving path screen 543 corresponding to a position where the sensing information has been collected by the gas sensor module 300.

Accordingly, a user may be provided, on the map screen, with a moving path of the mobile terminal for a specific period (one day) and an air state at a corresponding position included in the moving path.

Figure 6A:
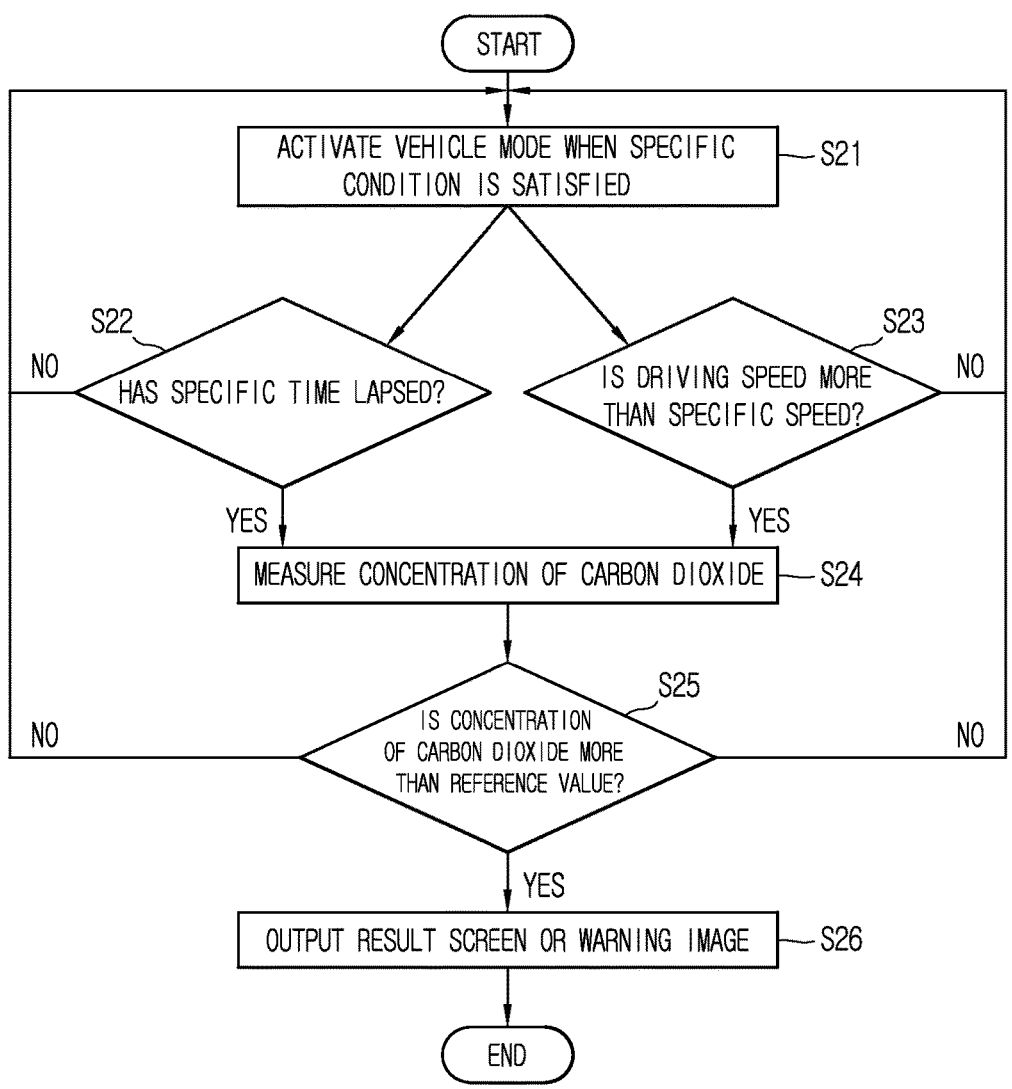
Figure 6B:
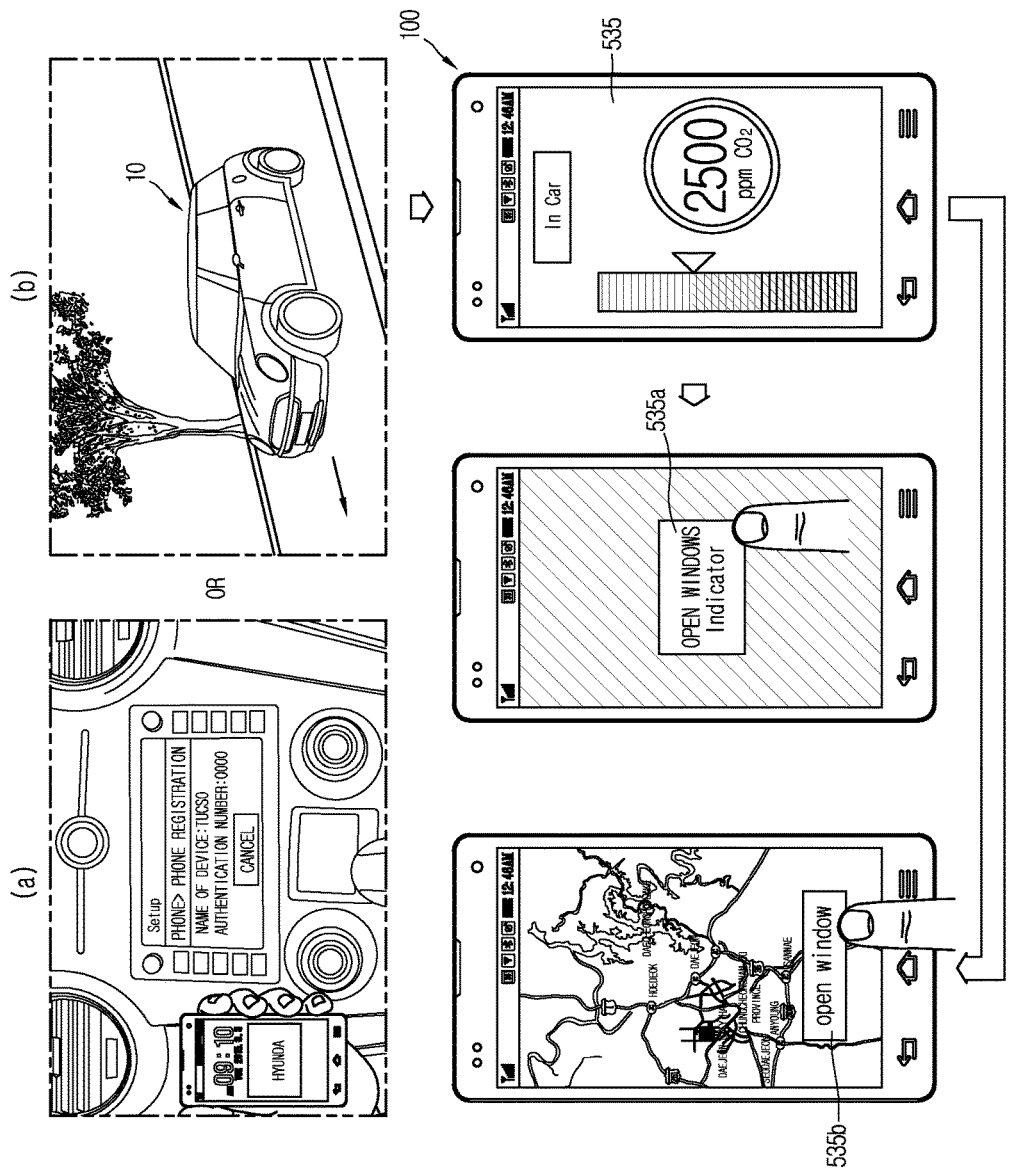

FIGS. 6A to 6C are conceptual views illustrating a control method for sensing preset gas based on a position of the mobile terminal according to another embodiment of the present invention.

Referring to FIGS. 6A and 6B, the controller 180 activates a vehicle mode when a specific condition is satisfied (S21). For instance, when the mobile terminal 100 is in a vehicle, the controller 180 receives a wireless signal by executing a wireless connection to the vehicle. The controller 180 activates a vehicle mode of the mobile terminal 100 when a wireless connection to the vehicle is executed or when a wireless signal is received. Alternatively, when a moving speed of the mobile terminal 100 sensed by the sensing unit is more than a specific value, the controller 180 activates the vehicle mode by determining that the mobile terminal is in the vehicle. However, the present invention is not limited to this. That is, the controller 180 may activate the vehicle mode when a control command for controlling a function of the vehicle is applied by a user.

In the vehicle mode, the controller 180 may determine whether more than a specific time has lapsed after the activation of the vehicle mode (S22), and whether a driving speed is more than a specific value (S23).

If more than the specific time has lapsed and the driving speed is more than the specific value, the controller 180 senses gas corresponding to the vehicle mode. The gas corresponding to the vehicle mode may be set by a user, or may be determined based on driving state information received from the vehicle. For instance, the gas corresponding to the vehicle mode may correspond to carbon dioxide inside the vehicle, but the present invention is not limited to this. When windows of the vehicle are open, gas for measuring a degree of exhaust gas introduced from the outside may be sensed.

The controller 180 measures a concentration of carbon dioxide (S24), and determines whether the measured concentration of the carbon dioxide is more than a reference value (S25).

If the measured concentration of the carbon dioxide is less than the reference value, the controller 180 re-senses lapse of time and a driving speed of the vehicle after the activation of the vehicle mode. If the measured concentration of the carbon dioxide is more than the reference value, the controller 180 controls the display unit 151 to output a result screen including sensing information on the concentration of the carbon dioxide, or a warning image (S26). Referring to FIG. 6B again, the display unit 151 outputs a fifth result screen 535 based on the measured concentration of the carbon dioxide. The fifth result screen 535 may include an indicator (In car), etc. indicating a type of sensed gas, a concentration of the gas, a reference concentration, and a vehicle mode.

The display unit 151 may display a first result image 535*a* including guide information for changing the concentration of the sensed gas. For instance, the guide information may include guide information guiding to open or close windows of the vehicle, or guide information inducing a temporary stop of a driving or inducing the driver to take a rest. The first result image 535*a* may be configured in the form of a text and/or an image.

The display unit 151 may display a second result image 535*b* including the guide information for changing the concentration of the sensed gas. And the second result image 535*b* may include a graphic image for controlling a driving state of the vehicle. The controller 180 may transmit a control signal to the vehicle, based on a touch input applied to the graphic image. For instance, the controller 180 may control the wireless communication unit 110 to transmit a control signal for opening the windows to the vehicle, based on a touch input applied to the second result image 535*b*. Accordingly, a user may change a driving state of the vehicle in order to change the concentration of the sensed gas, using the mobile terminal 100.

In this embodiment, a user may sense a type and a concentration of gas harmful to himself or herself in a current space while driving the vehicle. Accordingly, the user may check information on gas sensed during the driving, and may take a corresponding step. This may prevent the user from sucking harmful gas while driving the vehicle, or may allow the user to maintain a comfortable state of the vehicle through ventilation.

Referring to FIG. 6C, the display unit 151 outputs the fifth result screen 535 including sensing information of gas. In this case, the controller 180 may transmit a wireless signal corresponding to the fifth result screen 535, to the vehicle 10. For instance, when an external display device 11 is mounted in the vehicle 10, the external display device 11 having received the wireless signal outputs a warning message or audio data 535*c*.

The controller 180 controls the audio output unit 122 to output the audio data 535*d*, while outputting the fifth result screen 535. The audio data 535*d* may be formed as voice indicating guide information.

In this embodiment, when gas harmful to a human body is sensed while a user is driving the vehicle, or when a concentration of gas is harmful, the user may be provided with sensing information about the gas without an additional control command. Since the sensing information is notified in the form of audible data or is displayed on an external device mounted to the vehicle, the user may take a proper step after recognizing the sensing information. This may allow the user to drive the car in a stable condition.

FIGS. 7A to 7D are conceptual views illustrating a control method for sensing different types of gas based on a driving state of the vehicle according to another embodiment of the present invention.

Figure 7A:
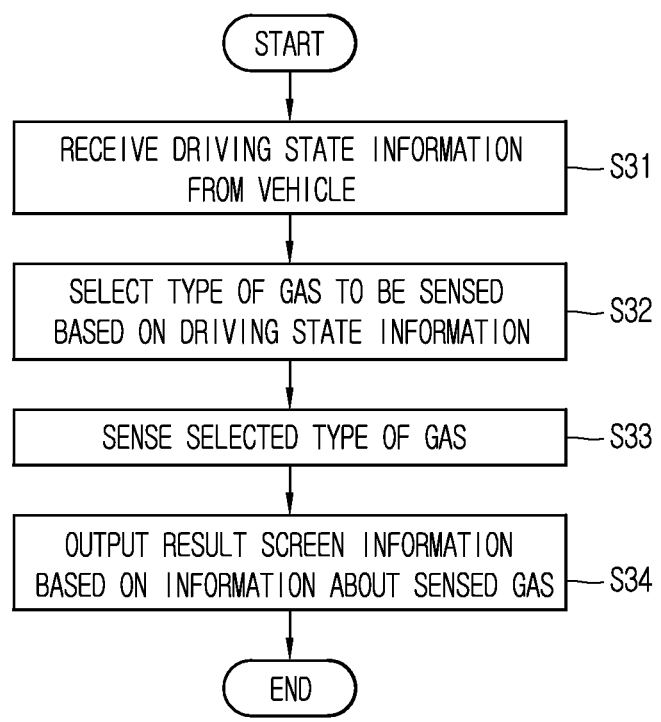
FIGS. 7A to 7D are conceptual views illustrating a control method for sensing different types of gas based on a driving state of a vehicle according to another embodiment of the present invention.
Figure 7B:
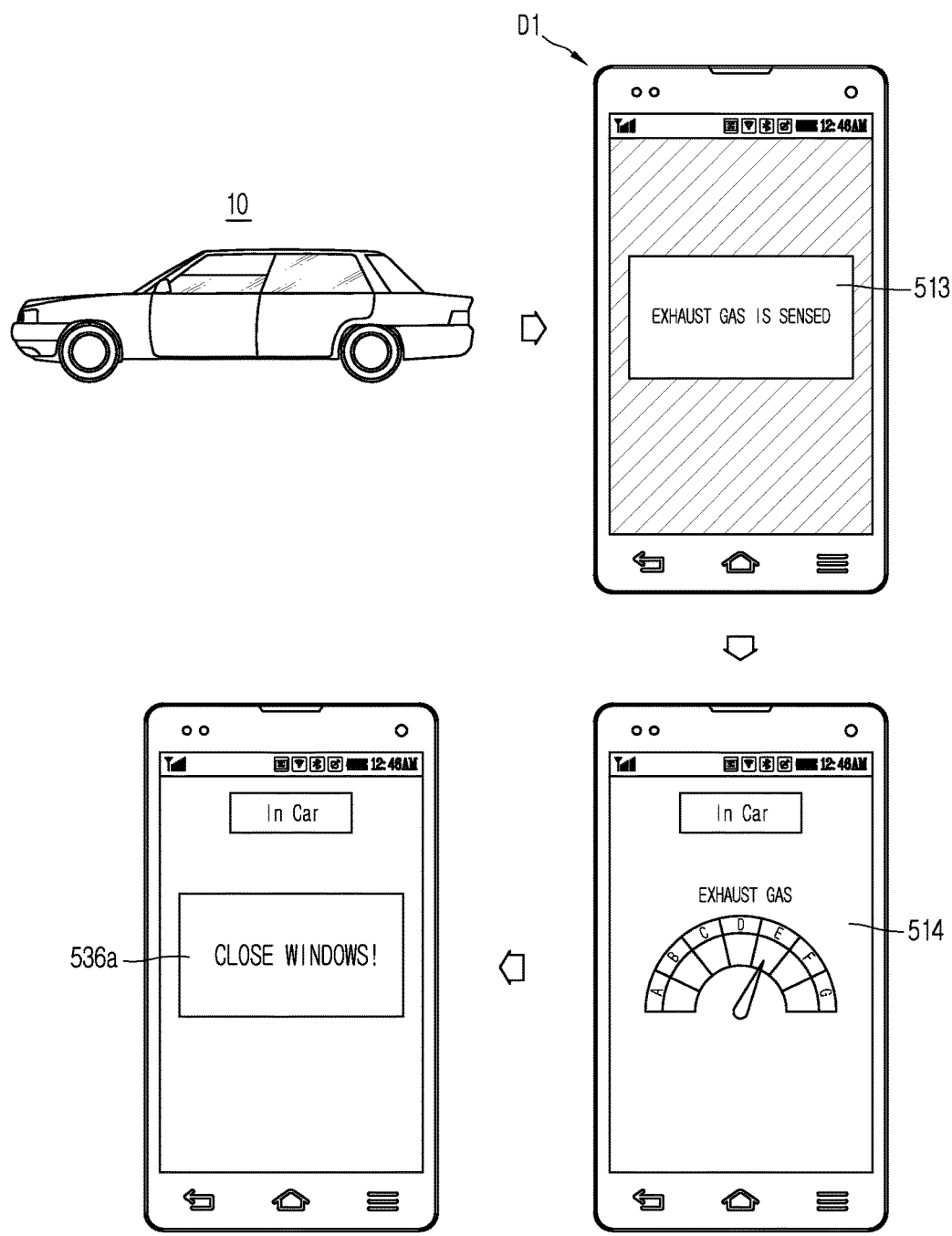
Figure 7C:
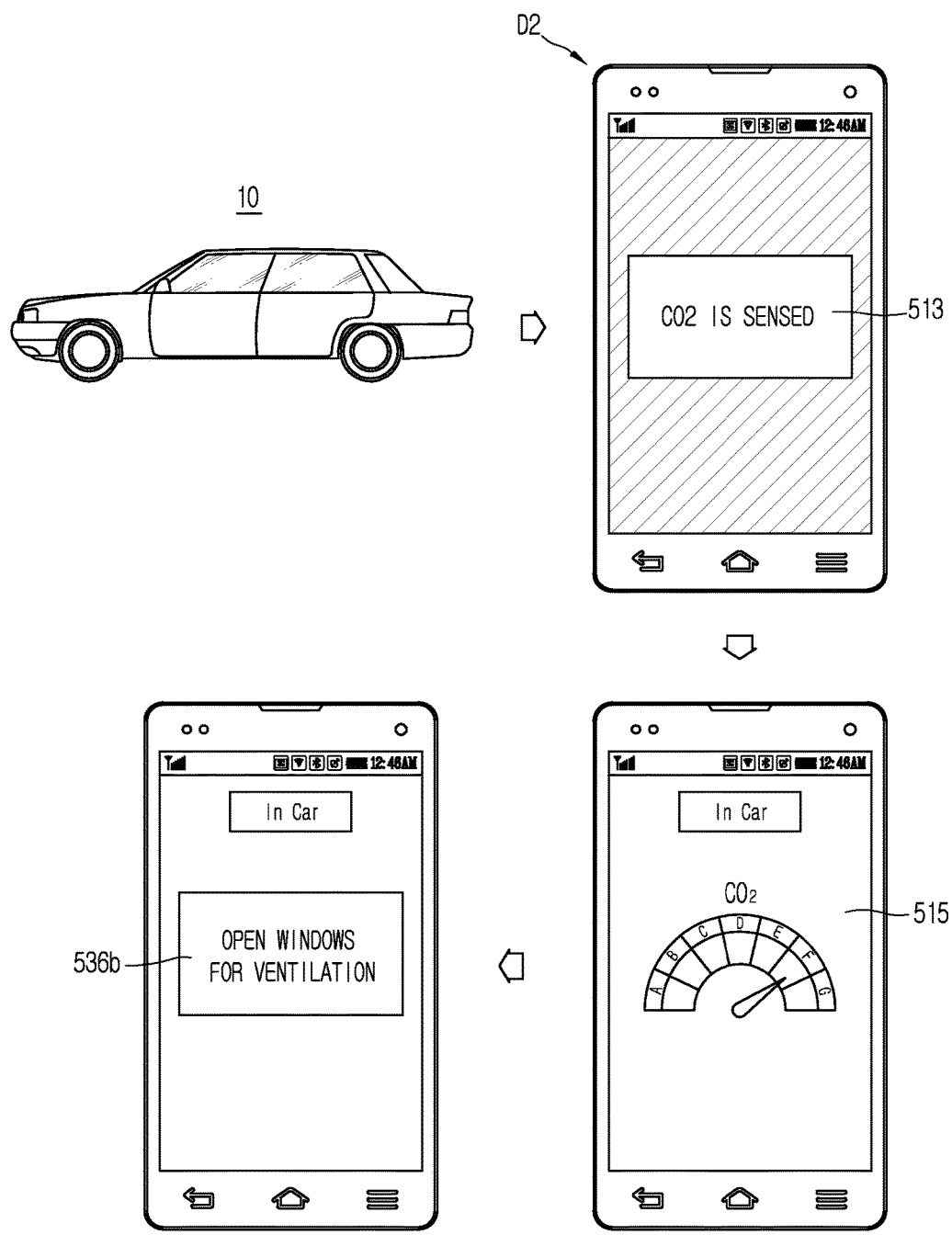

Referring to FIGS. 7A to 7C, the controller 180 controls the wireless communication unit 110 to receive driving state information D1, D2 from the vehicle (S31). The wireless communication unit 110 may receive the driving state information once per specific period, in the mounted state in the vehicle.

Once the driving state information D1, D2 is received, the controller 180 selects a type of gas to be sensed based on the driving state information D1, D2 (S32). Referring to FIGS. 7B and 7C, the first driving state information D1 includes information indicating that the windows of the vehicle are open. The controller 180 controls the gas sensor module 300 to sense gas included in exhaust gas, based on the first driving state information D1. In this case, the display unit 151 displays a third sensing image 513 including a message indicating check of exhaust gas. The third sensing image 513 may include a control image for restricting driving of the gas sensor module 300.

The second driving state information D2 includes information indicating that the windows of the vehicle are closed. The controller 180 controls the gas sensor module 300 to sense carbon dioxide inside the vehicle, based on the second driving state information D2. The display unit 151 outputs the third sensing image 513 indicating the sensing of the carbon dioxide.

While the selected type of gas is sensed by the gas sensor module 300 (S33), the display unit 151 may display a fourth sensing image 514 and a fifth sensing image 515 each indicating a measured degree of corresponding gas. The fourth and fifth sensing images 514, 515 may include a measured state by the gas sensor module 300, a type of gas to be measured, a reference value of a preset normal range, etc.

Once the sensing of a type and a concentration of the gas by the gas sensor module 300 is completed, the controller 180 controls the display unit 151 to output result screen information based on sensing information and driving state information of the sensed gas (S34). For instance, when a concentration of exhaust gas is more than a reference value in an open window state indicated by the first driving state information (D1), the display unit 151 outputs a sixth result screen 536*a* including a warning message instructing to close the windows.

On the other hand, when a concentration of carbon dioxide is more than the reference value in a closed window state, the display unit 151 outputs a sixth result screen 536b including a warning message instructing to open the windows for ventilation.

Accordingly, even if a user has not set a type of gas to be sensed according to a state of the vehicle, the mobile terminal may selectively sense gas according to a driving state of the vehicle.

Figure 7D:
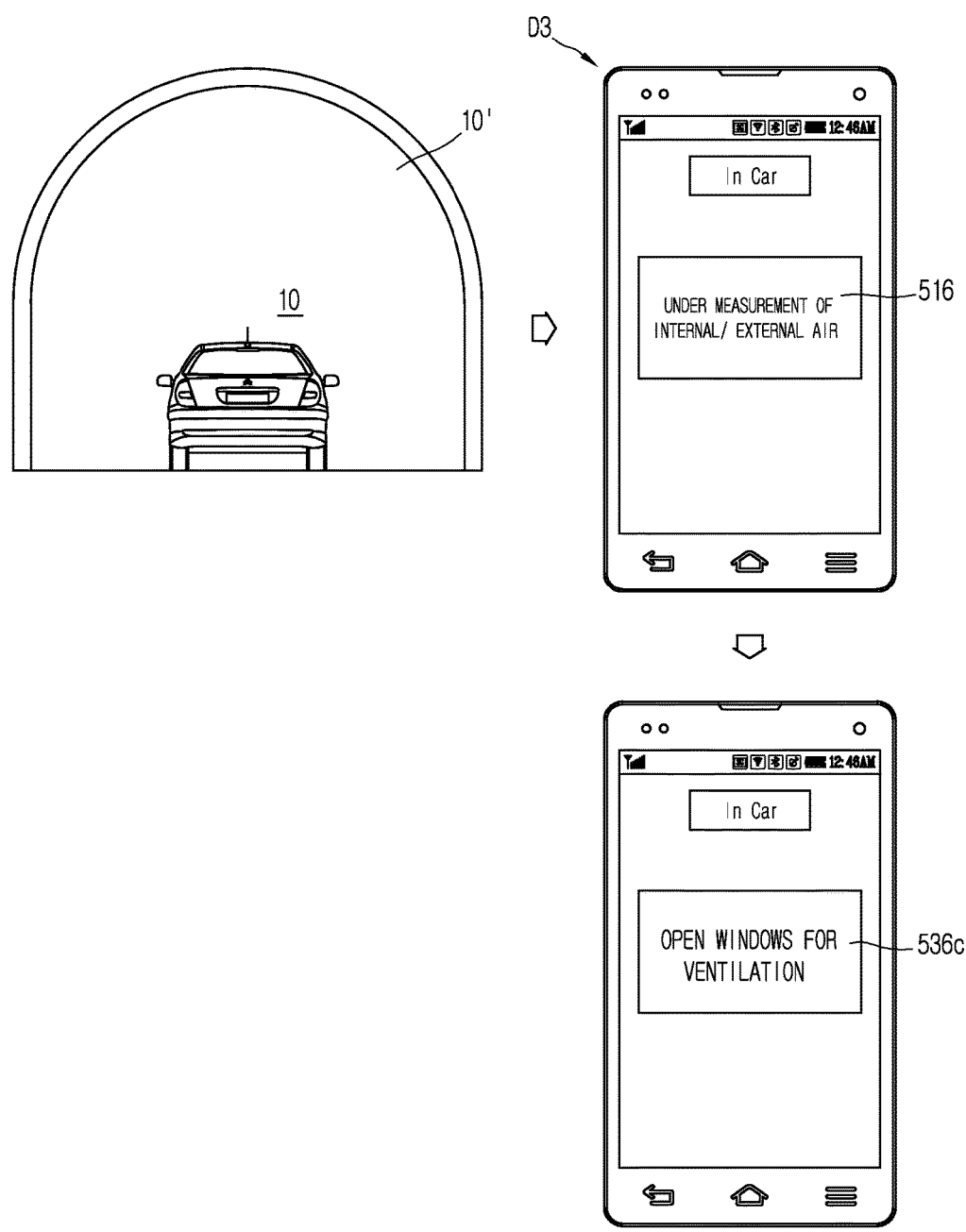

Referring to FIG. 7D, third driving state information D3 may include position information of the vehicle. If the vehicle 10 is running on a specific position based on the third driving state information D3, the controller 180 may control the gas sensor module 300 to sense gas corresponding to the specific position.

For instance, if it is determined that the vehicle 10 is passing through a tunnel, the controller 180 controls the gas sensor module 300 to sense a selected type of gas in order to check an air state inside the tunnel 10' and a state of air introduced from the outside. While the gas sensor module 300 is being driven, the display unit 151 may display a sixth sensing image 516 indicating an air state inside the tunnel 10' and a state of air introduced from the outside are under examination. The sixth sensing image 516 may include information on a current position of the vehicle 10, the information included in the third driving state information D3. Accordingly, a user may recognize a reason why the gas sensor module 300 has been activated to check the air state.

The controller 180 displays sixth result screen information 536c based on sensing information of the gas and the third driving state information D3. The controller 180 may control the display unit 151 to output the sixth result screen information 536c based on the third driving state information D3, at a time point when the vehicle is out of an area having a large amount of exhaust gas. The controller 180 may control the wireless communication unit 110 to continuously receive part or all of the third driving state information D3 for a preset time, after the sensing information is formed by the gas sensor module 300.

For instance, if it is determined that the vehicle 10 has been out of the tunnel based on the third driving state information D3, the controller 180 may control the display unit 151 to output the sixth result screen information 536c.

Figure 8A:
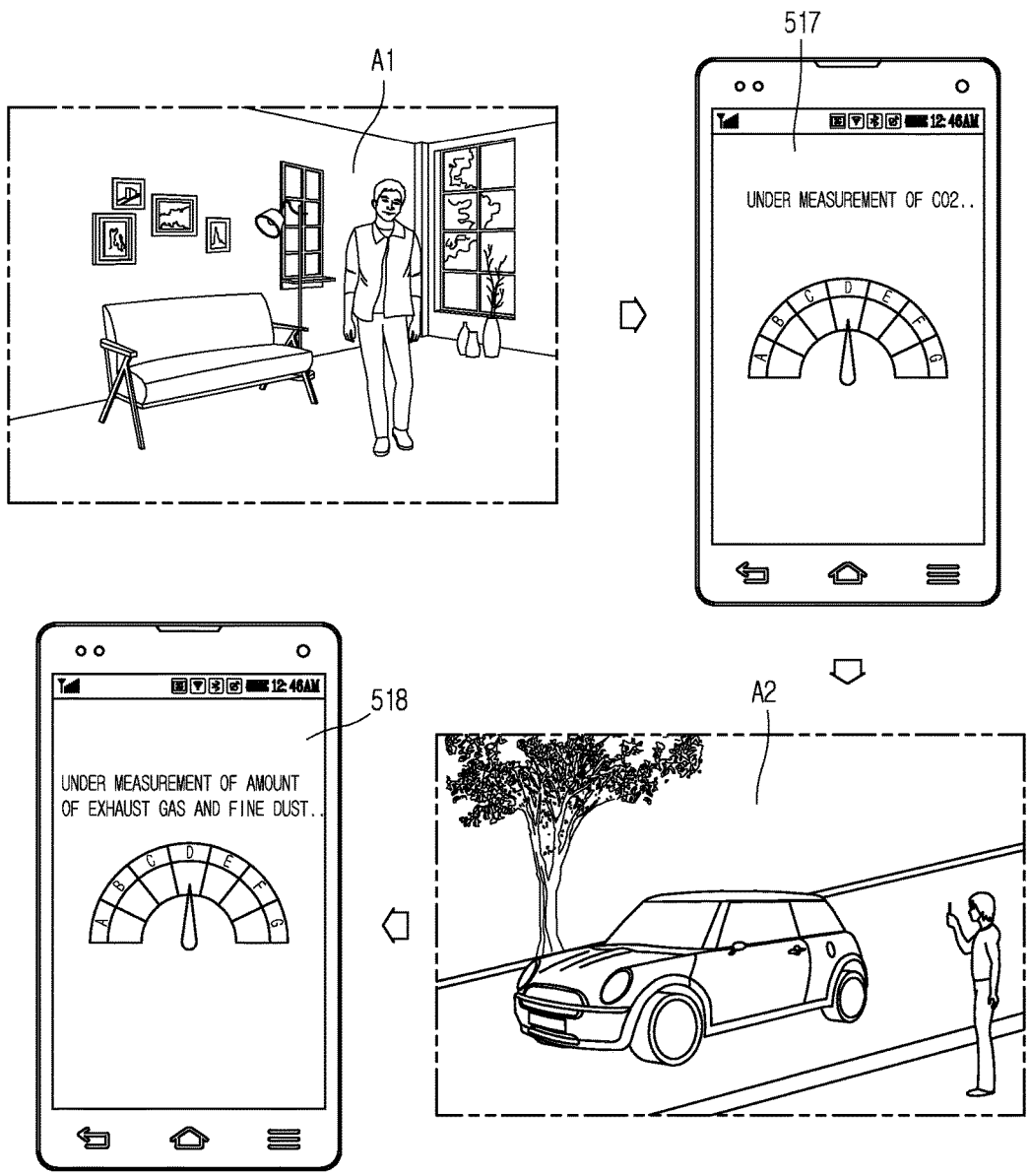
FIGS. 8A and 8B are conceptual views illustrating a control method for sensing a preset type of gas based on position information of a mobile terminal.
Figure 8B:
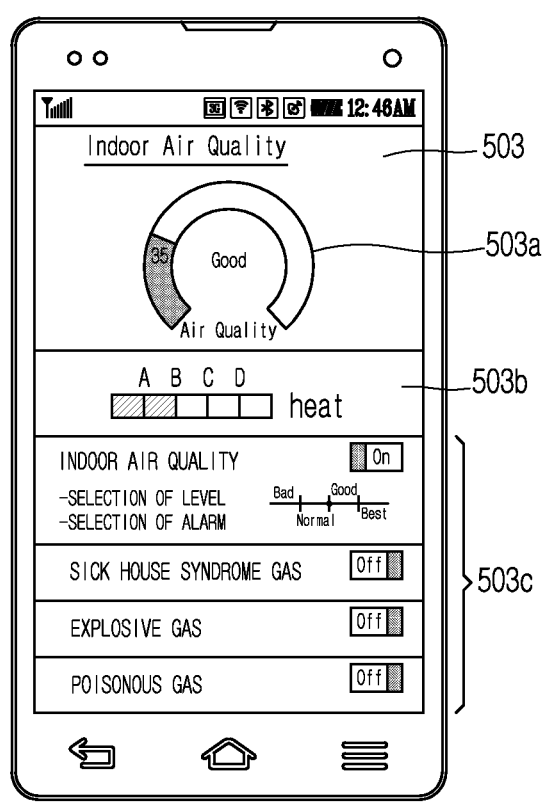

FIGS. 8A and 8B are conceptual views illustrating a control method for sensing a preset type of gas based on position information of the mobile terminal.

Referring to FIG. 8A, the controller 180 controls the location information module 115 to acquire position information at specific time periods. The controller 180 selects a type of gas to be sensed, based on position information (A1) acquired by the location information module 115. For instance, when the mobile terminal 100 is positioned indoors, the controller 180 controls the gas sensor module 300 to sense a concentration of carbon dioxide. The controller 180 controls the display unit 151 to display a seventh sensing image 517 while the concentration of the carbon dioxide is sensed.

If the position of the mobile terminal 100 sensed by the location information module 115 is changed, the controller 180 controls the gas sensor module 300 to sense other gas corresponding to a changed position. For instance, if position information (A2) on another position of the mobile terminal 100 is acquired by the location information module 115, the controller 180 controls the gas sensor module 300 to sense another type of gas corresponding to said another position. If the position information (A2) is about an outdoor position, the display unit 151 displays an eighth sensing image 518 indicating sensing of new gas.

The seventh and eighth sensing images 517, 518 may include information indicating a change of the acquired position information.

The display unit 151 may display a type of gas being measured on each of the seventh and eighth sensing images 517, 518. And each of the seventh and eighth sensing images 517, 518 may include a control image for selecting a type of gas.

In this embodiment, since the mobile terminal may sense a different type of gas to measure a current air state according to its position, a user needs not set additionally a type of gas to be sensed when he or she moves.

FIG. 8B is a conceptual view illustrating a setting screen for setting a sensing function of the gas sensor module 300.

The setting screen 503 is composed of first to third setting images. The first setting image 503a includes information on an air state measured the most recently. The second setting image 503b includes a graphic image for setting a temperature of a heater included in the gas sensor module 300. Based on the temperature of the heater, a type of gas to be sensed is determined. The second setting image 503b may be formed as a bar transformed after a touch input is received. On the bar, a type of gas corresponding to the temperature of the heater may be indicated.

The third setting image 503c may include images each configured to receive a touch input in order to set an alarm function based on a measured indoor air state. Accordingly, a level of an air state to output a notification, and an on/off of a notification may be set. And the third setting image 503c may set a type of gas for output a notification.

With such a configuration, a user may automatically sense gas, and may set the mobile terminal 100 to output a notification.

Figure 9A:
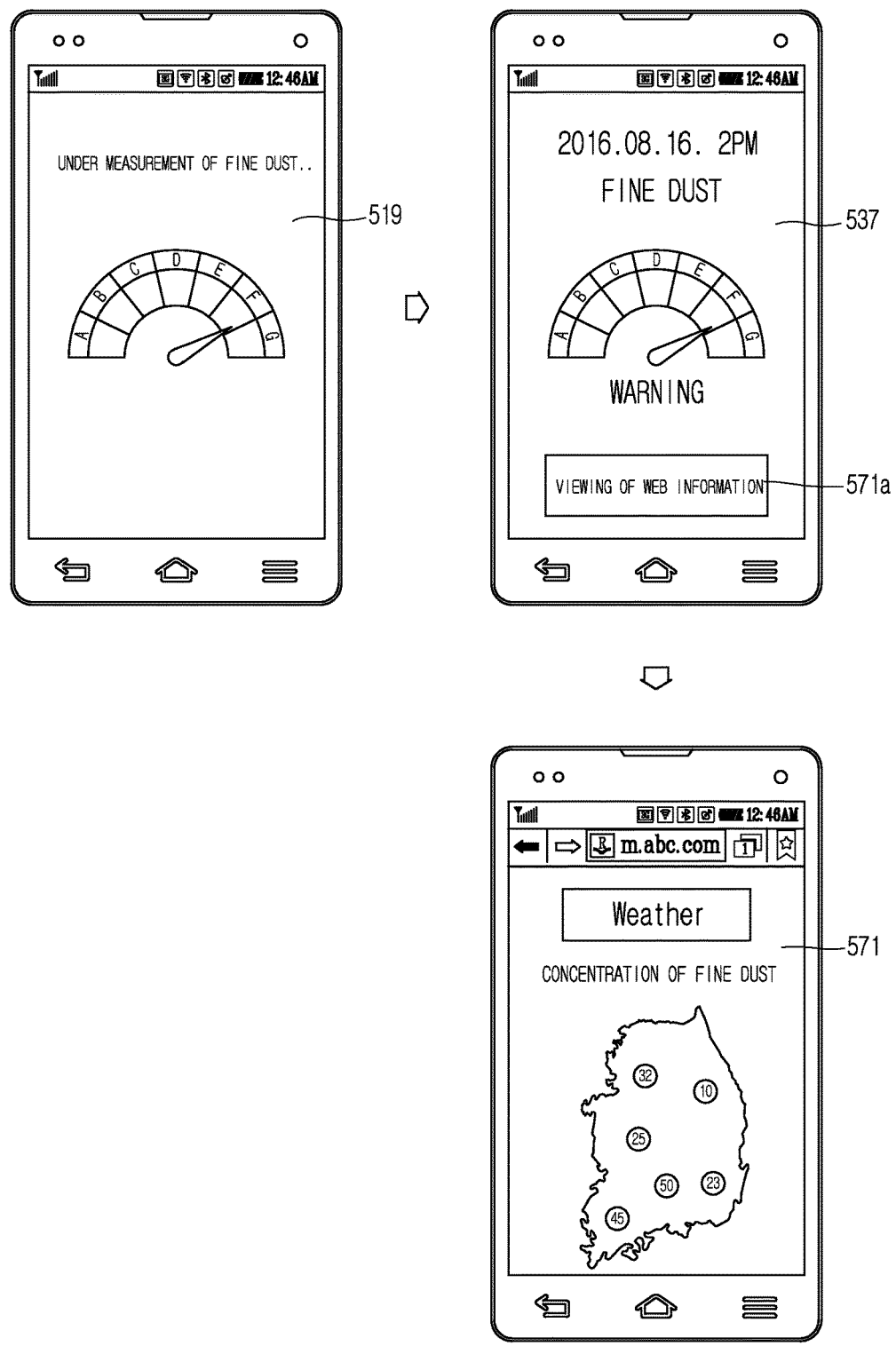
FIGS. 9A and 9B are conceptual views illustrating a control method for providing sensing information together with additional information received from a specific server.
Figure 9B:
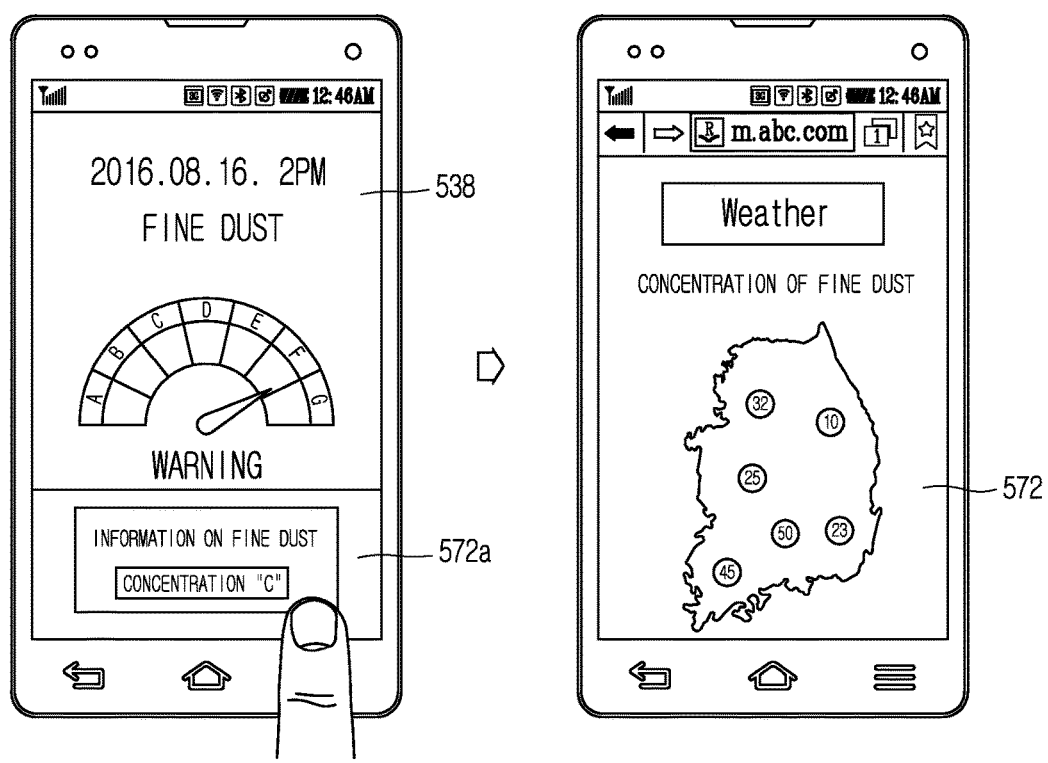

FIGS. 9A and 9B are conceptual views illustrating a control method for providing sensing information together with additional information received from a specific server.

Referring to FIG. 9A, the display unit 151 displays a ninth sensing image 519 while gas is measured. The ninth sensing image 519 may include a type of gas being sensed, and an air state currently sensed. Once the gas sensing by the gas sensor module 300 is completed, the display unit 151 outputs a seventh result screen 537. For instance, the seventh result screen 537 may include sensing information indicating an air state, a date and a time when gas has been sensed, and an analysis result (warning).

The controller 180 controls the display unit 151 to display a first control image 571a corresponding to additional information received from a server, on the seventh result screen 537. The controller 180 may control the wireless communication unit 110 to receive data on a current air state from the specific server, while the gas is sensed by the gas sensor module 300.

The controller 180 may control the display unit 151 to output the first control image 571a corresponding to the received wireless data on a current air state, on the seventh result screen 537. Alternatively, if data sensed by the gas sensor module 300 is different from the wireless data received from the server, the controller 180 may control the display unit 151 to display the first control image 571a.

If a movement of the mobile terminal 100 is sensed or other function is being executed while the gas is sensed by the gas sensor module 300, if a drastic temperature change is sensed, the controller 180 may control the wireless communication unit 110 to receive the wireless data from the server.

The controller 180 controls the display unit 151 to output first server data 571 based on a touch input applied to the first control image 571a. That is, the seventh result screen 537 is converted into the first server data 571. The first server data 571 may correspond to a web page connected to the server.

Referring to FIG. 9B, the display unit 151 includes a second control image 572a including data on a detailed air state, together with a eighth result screen 538. The controller 180 may compare the wireless data received from the server, with the sensing information sensed by the gas sensor module 300. Then, if the wireless data and the sensing information include different information, the controller 180 may display the second control image 572a including the different information.

Accordingly, the controller 180 may control the display unit 151 to display second server data 572, based on a touch input applied to the second control image 572a. The second server data 572 may correspond to a web page of the specific server.

The controller 180 may control the display unit 151 to display the second control image 572a only when warning information is included in the server data. Based on a user's setting, the sensing information or the wireless data may be firstly displayed.

In this embodiment, a user may be provided with more precise information, since he or she may be provided with data received from the server, as well as sensing information by the gas sensor module 300 of the mobile terminal 300.

Figure 10B:
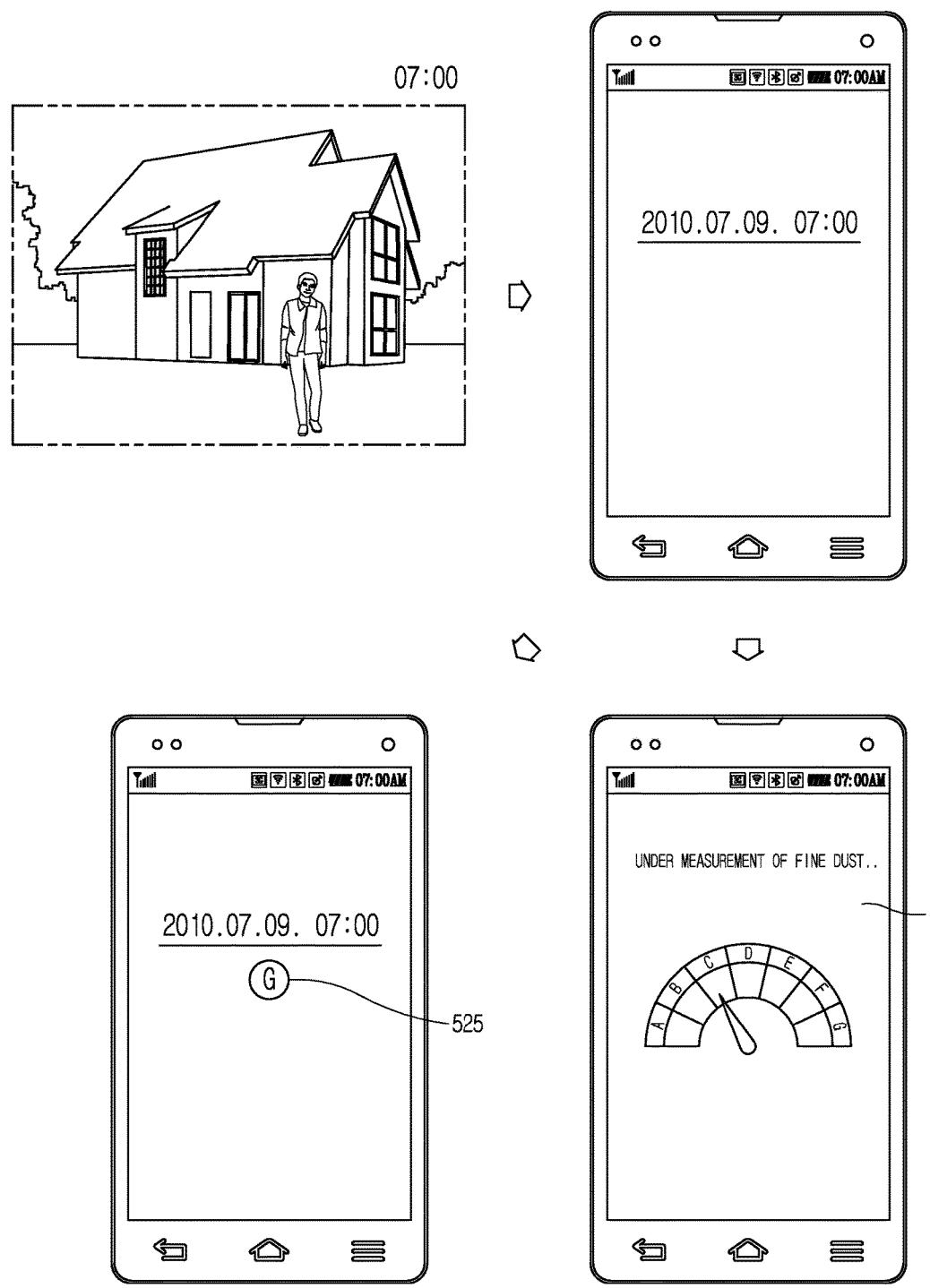

FIGS. 10A and 10B are conceptual views illustrating a control method for controlling the gas sensor module based on stored information.

Referring to FIG. 10A, the memory 170 includes calendar information stored together with a date by a user. The display unit 151 may display the calendar information on a calendar screen 545, and the controller 180 may output a notification screen indicating the calendar information.

The controller 180 may control the gas sensor module 300 to sense specific gas selected based on the calendar information. For instance, when the calendar information includes information about an outdoor position, the controller 180 controls the gas sensor module 300 in order to measure a concentration of fine dust.

The controller 180 controls the gas sensor module 300 based on video information included in the calendar information. The controller 180 controls the display unit 151 to display a ninth sensing image 519 indicating that gas sensing is being executed, after the notification screen has been output, or together with the notification screen.

Alternatively, a notification indicating an activated state of the gas sensor module 300 may be provided through vibrations, an LED lighting, etc., in a non-output state of the ninth sensing image 519.

In this embodiment, the controller 180 may set a time to drive the gas sensor module 300 and a type of gas, based on information set by a calendar function. And the controller 180 may activate the gas sensor module 300 without a user's control command based on the calendar information.

Referring to FIG. 10B, the controller 180 controls the memory 170 to store therein history information including user's position information and video information. The history information may be stored even when a user's control command is not individually applied.

The controller 180 predicts a user's position and selects a type of gas to be sensed, based on the history information. For instance, if the mobile terminal 100 is disposed on a specific position at a specific time based on the history information, the controller 180 controls the gas sensor module 300 to sense gas corresponding to the specific position at the specific time.

Once the gas sensor module 300 is activated, the controller 180 may control the display unit 151 to output the ninth sensing image 519. Alternatively, the controller 180 may control the display unit 151 to output the fifth result image 525 of an icon type together with a current time, instead of the ninth sensing image 519.

In this embodiment, gas related to a user's predicted position may be sensed even though a user's specific control command is not applied.

FIG. 11 is a conceptual view illustrating a control method for sharing sensing information.

Referring to FIG. 11, the display unit 151 displays the ninth sensing image 519 while the gas sensor module 300 is activated, and displays a ninth result screen 539 when a sensing function is completed. The display unit 151 displays a sharing icon 539a for sharing the ninth result screen 539, together with the ninth result screen 539.

The controller 180 controls the wireless communication unit 110 to transmit the ninth result screen 539 (and data included in the ninth result screen 539) to specific external devices 100a, 100b, based on a touch input applied to the sharing icon 539a.

The controller 180 may control the wireless communication unit 110 to transmit the data included in the ninth result screen 539, together with position information of the mobile terminal 100.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:
1. A mobile terminal, comprising:
a terminal body provided with a case having at least one hole;
a power supply unit;
a wireless communication unit;
a display unit;
a gas sensor module disposed near the case and configured to sense specific gas by air introduced through the at least one hole, wherein the gas sensor module comprises a heater for maintaining a temperature for sensing the specific gas; and
a controller configured to:
set a type of gas to be sensed based on an activated specific function;
control the gas sensor module to sense the set type of gas;
turn on or off the heater to maintain the temperature;

execute a burn-in function to drive the heater according to charging of the power supply unit and to ensure a stable driving of the gas sensor module;
compensate data sensed by the gas sensor module when the burn-in function is executed;
cause the display unit to display a compensation screen indicating that the data sensed by the gas sensor module is being compensated;
control the wireless communication unit to receive wireless data on a current air state from a server after the burn-in function is executed;
compare information about an air state obtained based on the sensed gas and the wireless data; and
cause the display unit to display the wireless data based on a result of the comparison.

2. The mobile terminal of claim 1, wherein the controller is further configured to cause the display unit to display the information about the air state,
wherein the controller is further configured to cause the display unit to display analysis data that compares the information about the air state with a preset value.

3. The mobile terminal of claim 2, wherein the analysis data includes at least one of a warning message based on the information about the air state, guide information related to body health, or disease information.

4. The mobile terminal of claim 2,
wherein when a call function is executed, the controller is further configured to control the gas sensor module to sense a specific type of gas included in respiration.

5. The mobile terminal of claim 4, wherein the controller is further configured to cause the display unit to display the information about the air state when the information about the air state is out of a reference range.

6. The mobile terminal of claim 2, further comprising a location information module configured to acquire position information,
wherein the controller is further configured to control the gas sensor module to sense a specific type of gas corresponding to the position information when the position information is acquired by the location information module.

7. The mobile terminal of claim 6, wherein the controller is further configured to control the gas sensor module to sense a different type of gas based on whether the mobile terminal is positioned indoors or outdoors.

8. The mobile terminal of claim 6, further comprising a memory,
wherein the controller is further configured to control the memory to store therein the information about the air state together with the position information.

9. The mobile terminal of claim 8, wherein the controller is further configured to calculate data about the air state based on the information about the air state, and
wherein when a change amount of the data is more than a preset value, the controller is further configured to control the memory to store therein the data about the air state, together with the position information.

10. The mobile terminal of claim 9, further comprising a sensing unit configured to sense a movement of the terminal body,
wherein if a movement of the terminal body sensed by the sensing unit is out of a reference range, the controller is further configured to temporarily stop driving of the gas sensor module.

11. The mobile terminal of claim 9, further comprising a camera configured to capture an image,
wherein when the gas sensor module is activated, the controller is further configured to activate the camera.

12. The mobile terminal of claim 11, wherein the controller is further configured to control the memory to store therein the information about the air state obtained via the gas sensor module, together with an image captured by the camera.

13. The mobile terminal of claim 12, wherein the controller is further configured to cause the display unit to display a result image corresponding to the information about the air state to the image, and
wherein the controller is further configured to cause the display unit to display the information about the air state and the position information, based on a touch input applied to the result image.

14. The mobile terminal of claim 6, wherein the controller is further configured to cause the display unit to display a map screen based on the position information, and
wherein the controller is further configured to cause the display unit to display a result image corresponding to the information about the air state on one region of the map screen corresponding to the position information.

15. The mobile terminal of claim 14, wherein the controller is further configured to control the location information module to sense a change of the position information due to a movement of the mobile terminal, and
wherein the controller is further configured to cause the display unit to display the information about the air state on a moving path screen due to a change of the position information.

16. The mobile terminal of claim 2,
wherein the controller is further configured to determine a type of gas to be sensed by the gas sensor module, based on driving state information received from a vehicle when the mobile terminal is wirelessly connected to the vehicle.

17. The mobile terminal of claim 16, wherein when a speed of the vehicle is more than a reference value, the controller is further configured to control the gas sensor module to sense a specific type of gas.

18. The mobile terminal of claim 2, further comprising a memory,
wherein the controller is further configured to control the memory to store therein data including at least video information or position information, and
wherein the controller is further configured to activate the gas sensor module based on the data including at least the video information or position information.

19. The mobile terminal of claim 1, wherein the wireless data is displayed when the wireless data and the information about the air state include different information or when warning information is included in the wireless data.

20. A method of controlling a mobile terminal comprising a gas sensor module and a power supply unit, wherein the gas sensor module comprises a heater for maintaining a temperature for sensing specific gas, the method comprising:
activating a specific function based on a control command or a pre-stored setting;
setting a type of gas to be sensed based on the activated specific function;
sensing the set type of gas by the gas sensor module;
turning on or off the heater to maintain the temperature;
executing a burn-in function to drive the heater according to charging of the power supply unit and to ensure a stable driving of the gas sensor module;
compensating data sensed by the gas sensor module when the burn-in function is executed;

displaying a compensation screen indicating that the data sensed by the gas sensor module is being compensated;
receiving wireless data on a current air state from a server after the burn-in function is executed;
comparing information about an air state obtained based on the sensed gas and the wireless data; and
displaying the wireless data based on a result of the comparison.

* * * * *